US010419372B2

(12) United States Patent
Kansky

(10) Patent No.: US 10,419,372 B2
(45) Date of Patent: *Sep. 17, 2019

(54) METHOD, SYSTEM AND APPARATUS FOR ESTABLISHING AND MONITORING SESSIONS WITH CLIENTS OVER A COMMUNICATION NETWORK

(71) Applicant: LiveHelpNow, LLC, Bethlehem, PA (US)

(72) Inventor: Michael Kansky, Doylestown, PA (US)

(73) Assignee: LiveHelpNow, LLC, Quakertown, PA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/420,893

(22) Filed: Jan. 31, 2017

(65) Prior Publication Data
US 2017/0142040 A1 May 18, 2017

Related U.S. Application Data

(63) Continuation of application No. 14/880,353, filed on Oct. 12, 2015, now Pat. No. 9,584,375, and a (Continued)

(51) Int. Cl.
*H04L 12/58* (2006.01)
*H04L 29/08* (2006.01)
(Continued)

(52) U.S. Cl.
CPC .......... *H04L 51/046* (2013.01); *G06F 3/0481* (2013.01); *G06F 3/04847* (2013.01);
(Continued)

(58) Field of Classification Search
CPC .... G06F 3/048; G06F 3/04847; G06F 3/0481; G06F 2203/04803; H04L 51/046;
(Continued)

(56) References Cited

U.S. PATENT DOCUMENTS 5,941,957 A   8/1999 Ingrassia, Jr. et al.
5,951,652 A   9/1999 Ingrassia, Jr. et al.
(Continued)

OTHER PUBLICATIONS

12Planet Chat end-user manual, Document version 1.0 (12Planet—2002. All rights reserved), p. 11.
(Continued)

*Primary Examiner* — Mahelet Shiberou
(74) *Attorney, Agent, or Firm* — Dickinson Wright, PLLC

(57) ABSTRACT

Systems and methods provide real-time communication between website operators and website visitors including monitoring, gathering, managing and sharing of information. The features include: simultaneous chatting with system's website visitor while responding/submitting tickets/emails and searching through company knowledge base; operator communicating message to another operator directly in active chat session, while message remains hidden to visitors/customers; displaying advertising messages to visitors/customers within chat window during active chat sessions; growing knowledge base by adding information into knowledge base during chat session; providing real-time access to system's website visitor information by seeing the content of visitor's shopping cart or by passing information from system's server into visitor's information located in operator's panel; creating and branding multiple chat windows and selectively linking all or some to the account; tagging and grouping each chat sessions; parent-child ticketing for project management; lead scoring; and mobile live chatting.

20 Claims, 28 Drawing Sheets

Related U.S. Application Data continuation of application No. 13/328,691, filed on Dec. 16, 2011, now Pat. No. 9,178,950.

(60) Provisional application No. 61/424,486, filed on Dec. 17, 2010.

(51) Int. Cl.
*G06F 3/0481* (2013.01)
*G06F 3/0484* (2013.01)
*H04L 12/24* (2006.01)
*G06Q 30/02* (2012.01)
*G06Q 30/06* (2012.01)

(52) U.S. Cl.
CPC ......... *G06Q 30/0277* (2013.01); *H04L 41/22* (2013.01); *H04L 67/22* (2013.01); *G06F 2203/04803* (2013.01); *G06Q 30/0633* (2013.01)

(58) Field of Classification Search
CPC ....... H04L 12/581; H04L 51/04; H04L 41/22; H04L 67/22; G06Q 10/10; G06Q 10/107; G06Q 30/0277; G06Q 30/0633
See application file for complete search history.

(56) References Cited

U.S. PATENT DOCUMENTS

| | | | |
|---|---|---|---|
| 5,954,798 A | 9/1999 | Shelton et al. | |
| 6,317,794 B1 | 11/2001 | Papierniak et al. | |
| 6,658,466 B1 | 12/2003 | Ellestad et al. | |
| 7,100,116 B1 | 8/2006 | Shafrir et al. | |
| 7,103,846 B1 | 9/2006 | Shafrir et al. | |
| 7,861,176 B2 | 12/2010 | Weisberg | |
| 7,945,620 B2 | 5/2011 | Bou-Ghannam et al. | |
| 8,020,105 B1 | 9/2011 | Lemay et al. | |
| 8,271,402 B2 | 9/2012 | Fisher, Jr. | |
| 8,271,507 B2 | 9/2012 | Farmer | |
| 8,346,877 B2 | 1/2013 | Turner | |
| 9,715,677 B2* | 7/2017 | Gilliam | G06Q 10/107 |
| 2002/0103647 A1* | 8/2002 | Houplain | G10L 15/26 704/260 |
| 2003/0014489 A1 | 1/2003 | Inala et al. | |
| 2004/0145608 A1 | 7/2004 | Fay et al. | |
| 2005/0188007 A1 | 8/2005 | Warner et al. | |
| 2006/0129455 A1* | 6/2006 | Shah | G06Q 30/02 705/14.54 |
| 2006/0161851 A1 | 7/2006 | Chen et al. | |
| 2006/0203993 A1 | 9/2006 | Busey et al. | |
| 2007/0288560 A1 | 12/2007 | Bou-Ghannam et al. | |
| 2008/0172574 A1 | 7/2008 | Fisher | |
| 2008/0178096 A1 | 7/2008 | Kusuda | |
| 2008/0259155 A1 | 10/2008 | McLelland et al. | |
| 2009/0083380 A1 | 3/2009 | Smyth et al. | |
| 2009/0245500 A1 | 10/2009 | Wampler | |
| 2009/0282421 A1 | 11/2009 | Jaffer et al. | |
| 2010/0005402 A1 | 1/2010 | George et al. | |
| 2010/0042503 A1 | 2/2010 | Farmer | |
| 2010/0246800 A1 | 9/2010 | Geppert et al. | |
| 2012/0005224 A1 | 1/2012 | Ahrens et al. | |
| 2012/0017149 A1 | 1/2012 | Lai et al. | |
| 2013/0060849 A1* | 3/2013 | Zimmet | G06Q 10/103 709/204 |
| 2013/0129076 A1* | 5/2013 | Kannan | H04M 3/5175 379/265.09 |
| 2014/0282083 A1* | 9/2014 | Gaetano, Jr. | H04L 51/04 715/752 |

OTHER PUBLICATIONS

ELiveService 3.0, live customer service on your website (Copyright 2003 eLiveService).

* cited by examiner

METHOD, SYSTEM AND APPARATUS FOR ESTABLISHING AND MONITORING SESSIONS WITH CLIENTS OVER A COMMUNICATION NETWORK

CROSS-REFERENCE TO RELATED APPLICATION

This application is a continuation application of U.S. patent application Ser. No. 14/880,353, filed Oct. 12, 2015, which is a continuation application of U.S. patent application Ser. No. 13/328,691, filed Dec. 16, 2011 and issued as U.S. Pat. No. 9,178,950 on Nov. 3, 2015, which claims benefit under 35 U.S.C. § 119(e) of U.S. provisional patent application Ser. No. 61/424,486 filed Dec. 17, 2010, the disclosure of which (including all of the attachments filed therewith on Dec. 17, 2010) is hereby incorporated by reference in its entirety.

BACKGROUND OF THE INVENTION

1. Field of the Invention

The invention is generally in the field of web-based computing and communication, and provides systems and methods for real-time communication between website operators and visitors to a website including monitoring, gathering, managing and sharing of information.

2. Discussion of the Background of the Invention

Providing requested information to users via the Internet is well known. In many instances, the information is provided in response to a user's request for information, such as requests for information from customers entering a retailer's website and seeking information about a product advertised on the retailer's website. Conventionally, a response to such a request is not communicated back to the customer in real-time but via, for example a reply email sent much later, with the only alternative for receiving real-time communication or support is calling the retailer directly.

Accordingly, one of the drawbacks of conventional web-based customer support is the delay in response. In addition, conventionally, visitors to a retailer's web-site are not engaged in a live real-time interaction with the retailer as would be the case in a brick-and-mortar store, which may decrease the retailer's chances for promoting and selling its products or services. Exemplary, non-limiting embodiments of the present invention address at least the forgoing drawback of conventional web-based systems.

SUMMARY OF THE INVENTION

Exemplary embodiments of the present invention address at least the above drawbacks and/or disadvantages and provide at least the advantages described below.

An exemplary embodiment of the present invention provides system and method allowing an operator to simultaneously chat with a visitor to the operator's website while responding/submitting tickets/emails and searching through the company knowledge base articles for information.

Another exemplary embodiment of the present invention provides system and method allowing implementation of a whisper technology, or ability for operator to communicate a message to another operator directly in the active chat session, this message will remain hidden to the visitors/customers.

Yet another exemplary embodiment of the present invention provides system and method for facilitating billboards, or an ability to display a series of scrolling advertising messages to visitors/customers within the chat window during active chat sessions.

Yet another exemplary embodiment of the present invention provides system and method for knowledge base intelligent growth which allows operators to add articles directly into the knowledge base module by clicking on a link in a chat session and within ticket entries.

Yet another exemplary embodiment of the present invention provides system and method for API Integration, which provides capability to pick up real-time information from a system's website visitor by seeing the content of a visitor's shopping cart or by passing information from the systems' server into the visitor's information located in the operator's panel.

Yet another exemplary embodiment of the present invention provides system and method that include multiple chat windows, which facilitates the ability to create and brand multiple chat windows and selectively link all or some them to the same account.

Yet another exemplary embodiment of the present invention provides system and method that include chat tagging, which facilitates the ability to tag each chat session and group thusly tagged chat sessions, for example, by any selected or assigned categories.

Yet another exemplary embodiment of the present invention provides system and method including parent-child ticketing for project management, which allows an unresolved ticket to be broken into subordinate tickets to facilitate management of complex tasks.

Yet another exemplary embodiment of the present invention provides system and method including lead scoring, which assigns a percentage score to each unique website visitor based on a combination of identifiable visitor data and specific visitor actions.

Yet another exemplary embodiment of the present invention provides system and method including mobile live chat between an operator/agent and a client/customer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

Figure 1F:
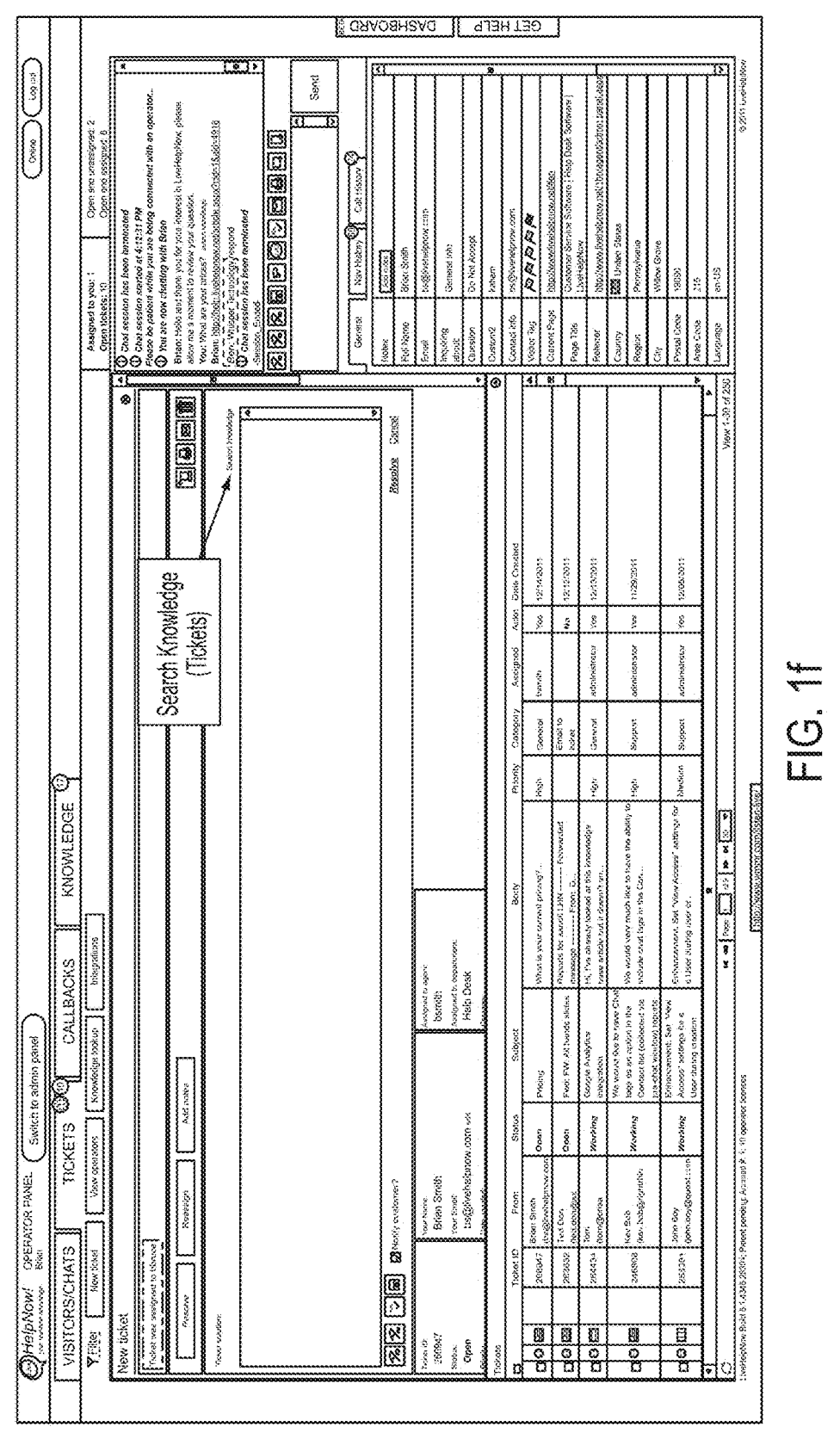
Figure 1G:
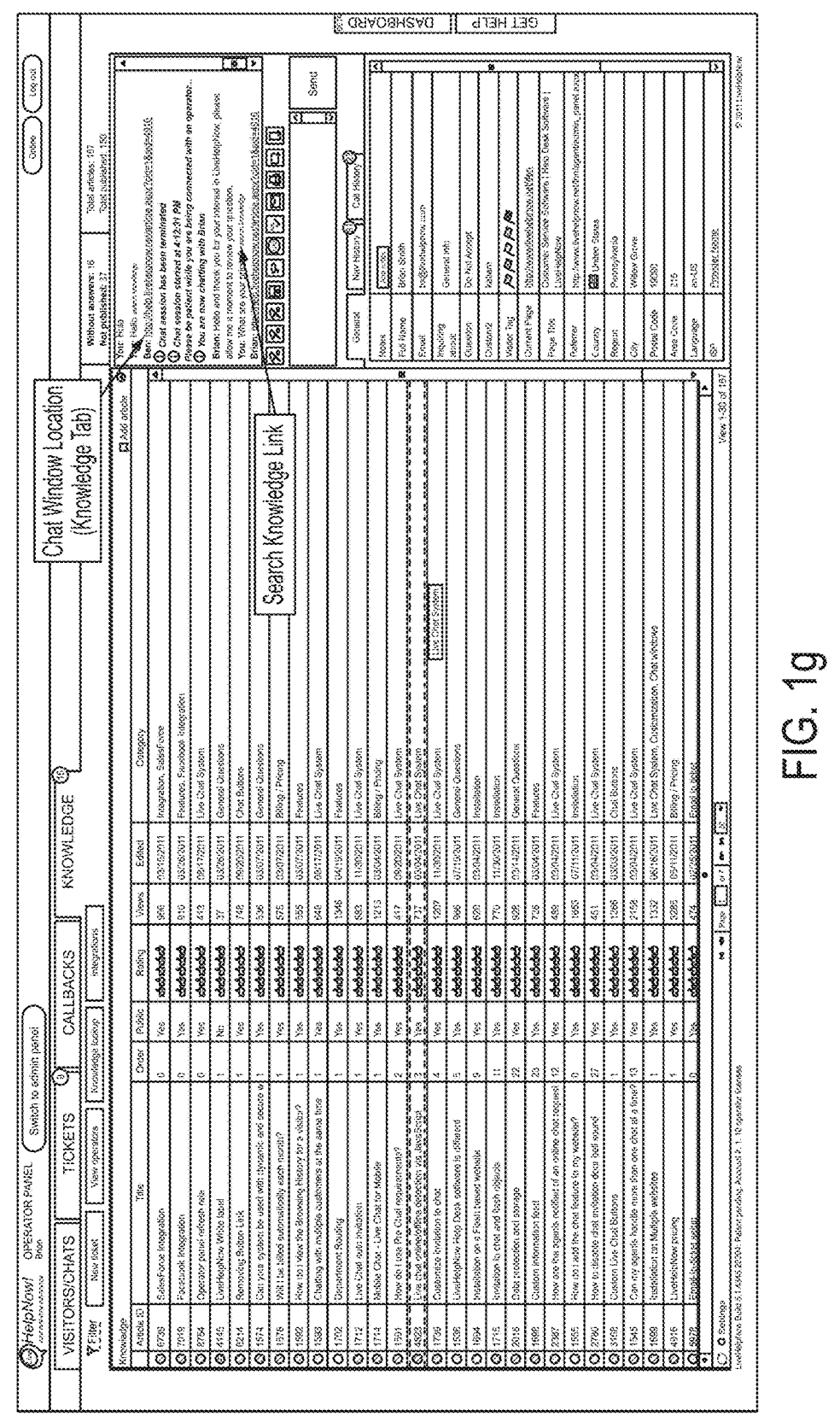

FIGS. 1a-1g are illustrative examples of graphical user interfaces and underlying computer-implemented functional modules facilitating multitasking according to exemplary embodiments of a system and methodology of the present invention.

FIGS. 2a-2c are illustrative examples of graphical user interfaces and underlying computer-implemented functional modules facilitating a whisper feature according to exemplary embodiments of a system and methodology of the present invention.

FIGS. 4a-4h are illustrative examples of graphical user interfaces and underlying computer-implemented functional modules facilitating knowledge base features according to exemplary embodiments of a system and methodology of the present invention.

FIGS. 7a and 7b are illustrative examples of a graphical user interface and underlying computer-implemented functional modules facilitating management of input received from website visitors according to exemplary embodiments of a system and methodology of the present invention.

FIGS. 8a and 8b are illustrative examples of a graphical user interface and underlying computer-implemented functional modules facilitating a chat tagging feature according to exemplary embodiments of a system and methodology of the present invention.

FIG. 9 is an illustrative example of a graphical user interface and underlying computer-implemented functional modules facilitating task assignment and management features according to exemplary embodiments of a system and methodology of the present invention.

DETAILED DESCRIPTION OF EXEMPLARY EMBODIMENTS

Figure 1A:
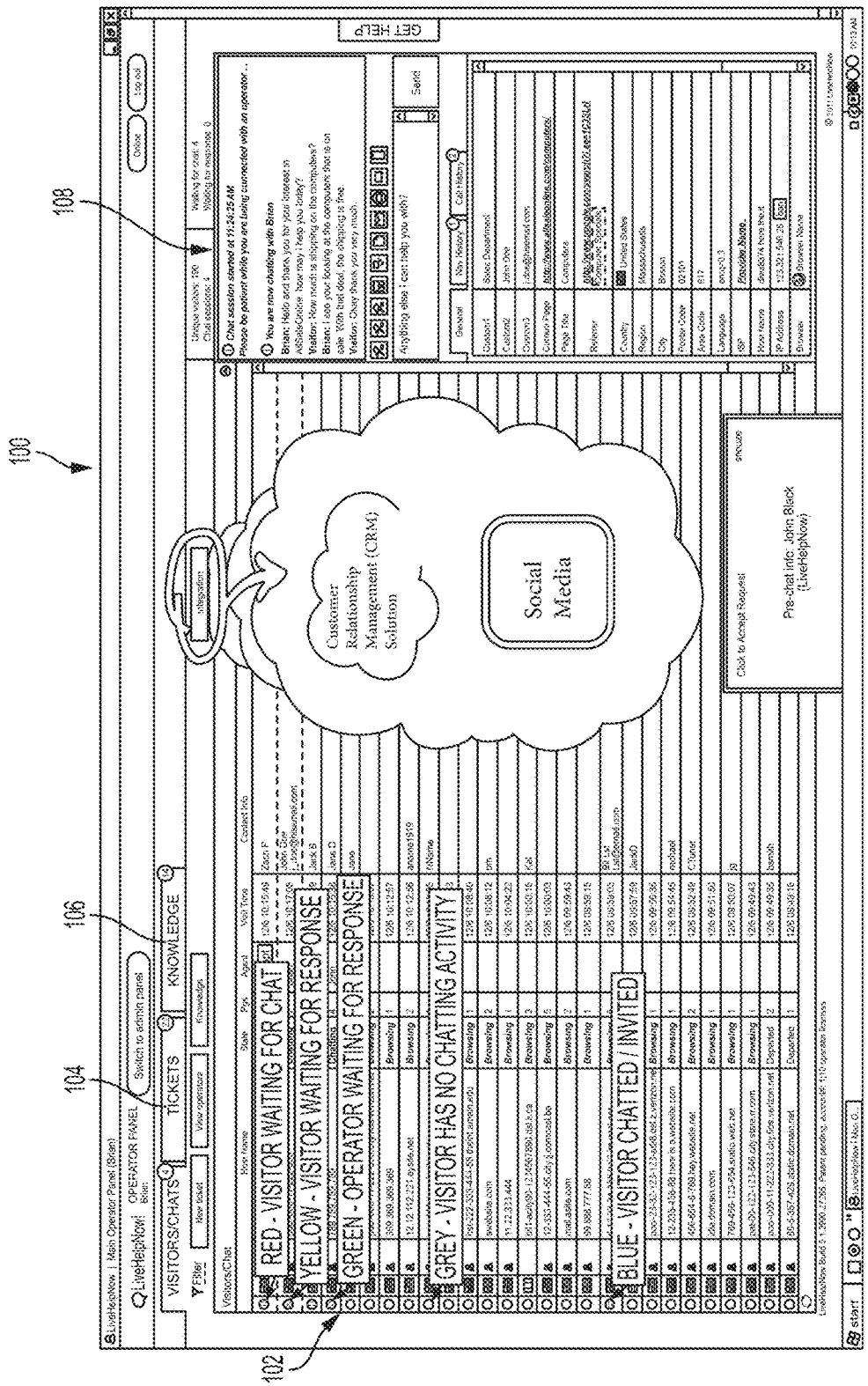
Figure 1B:
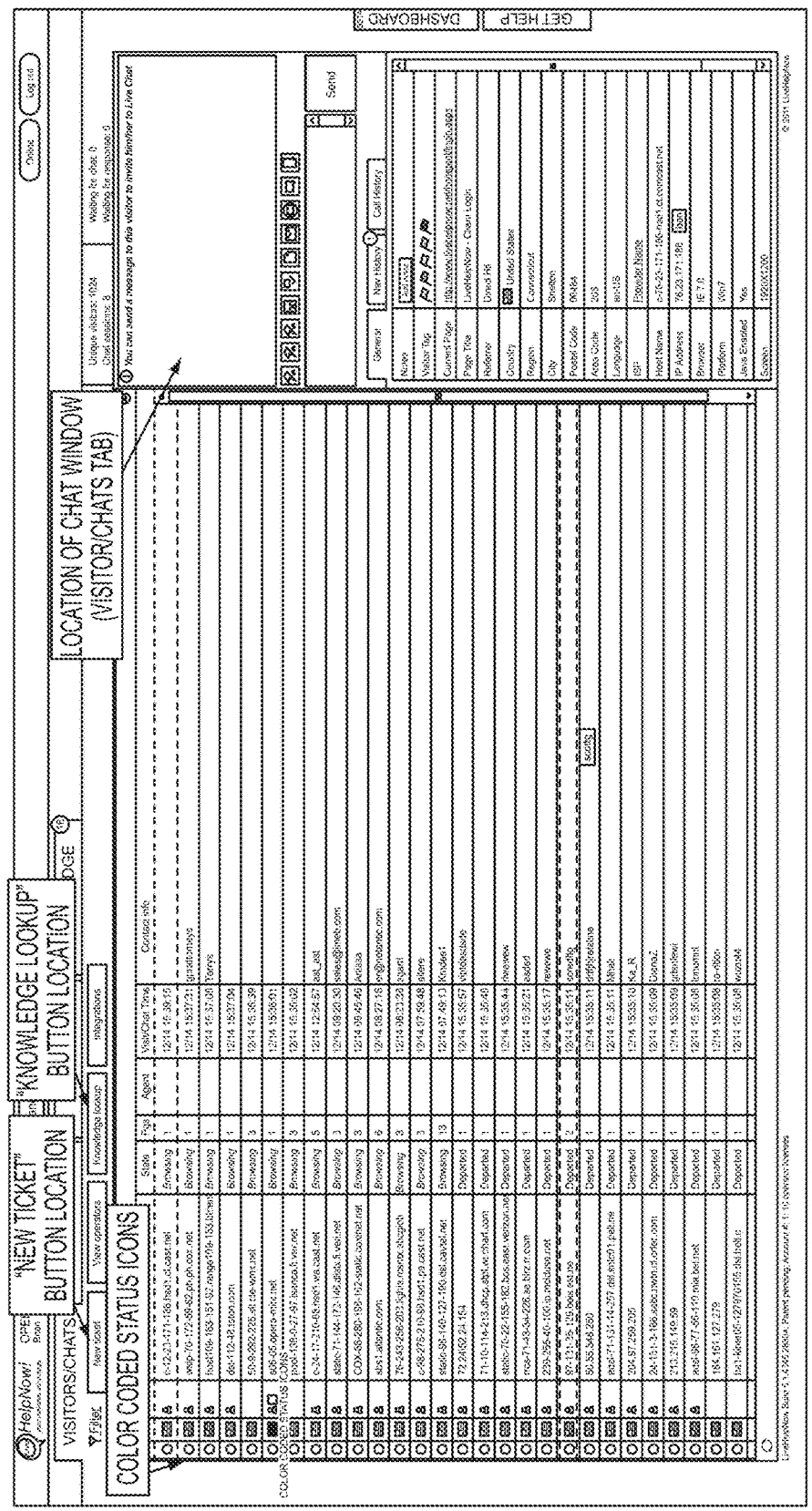
Figure 1C:
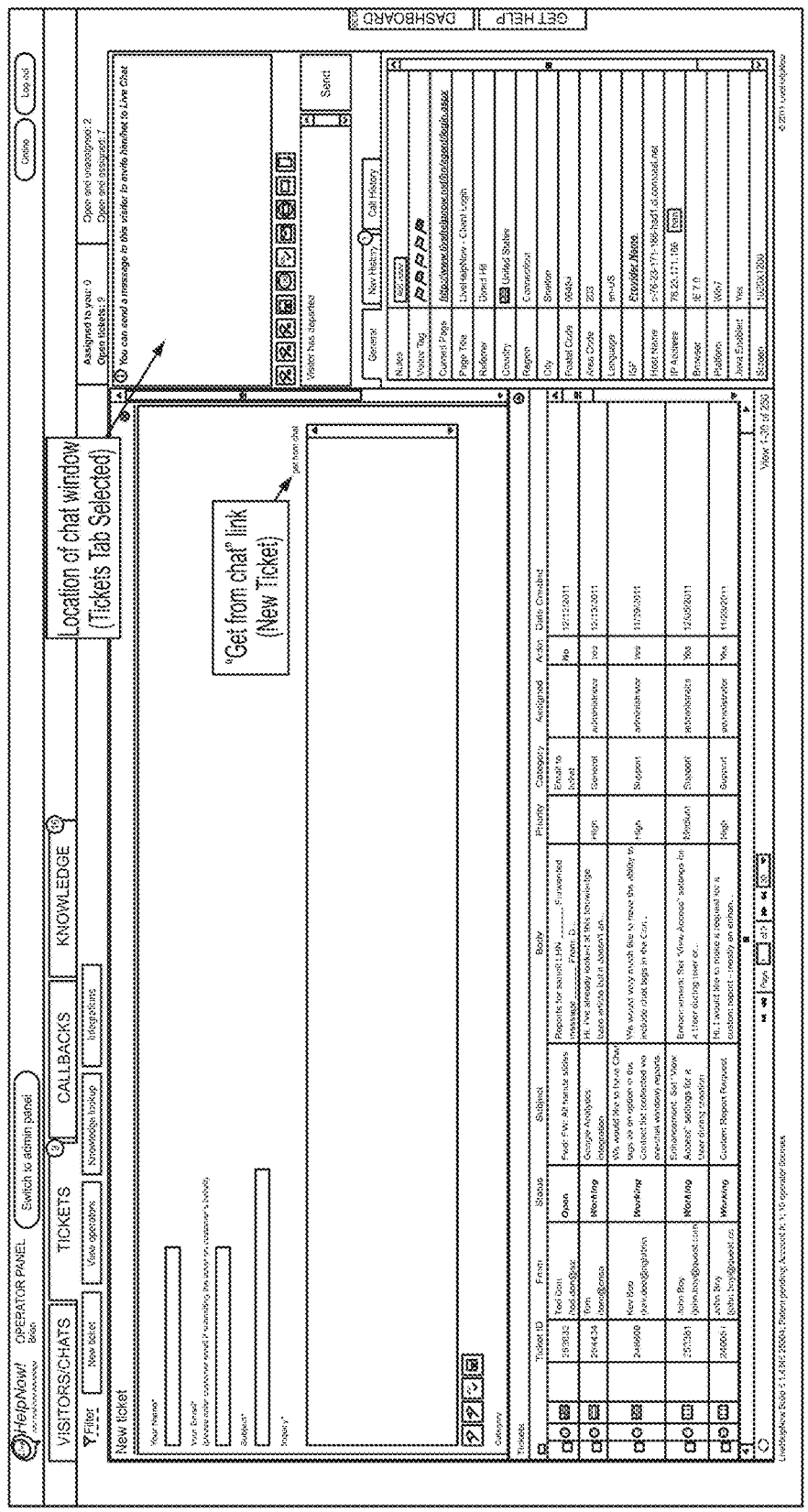
Figure 1D:
Figure 1E:
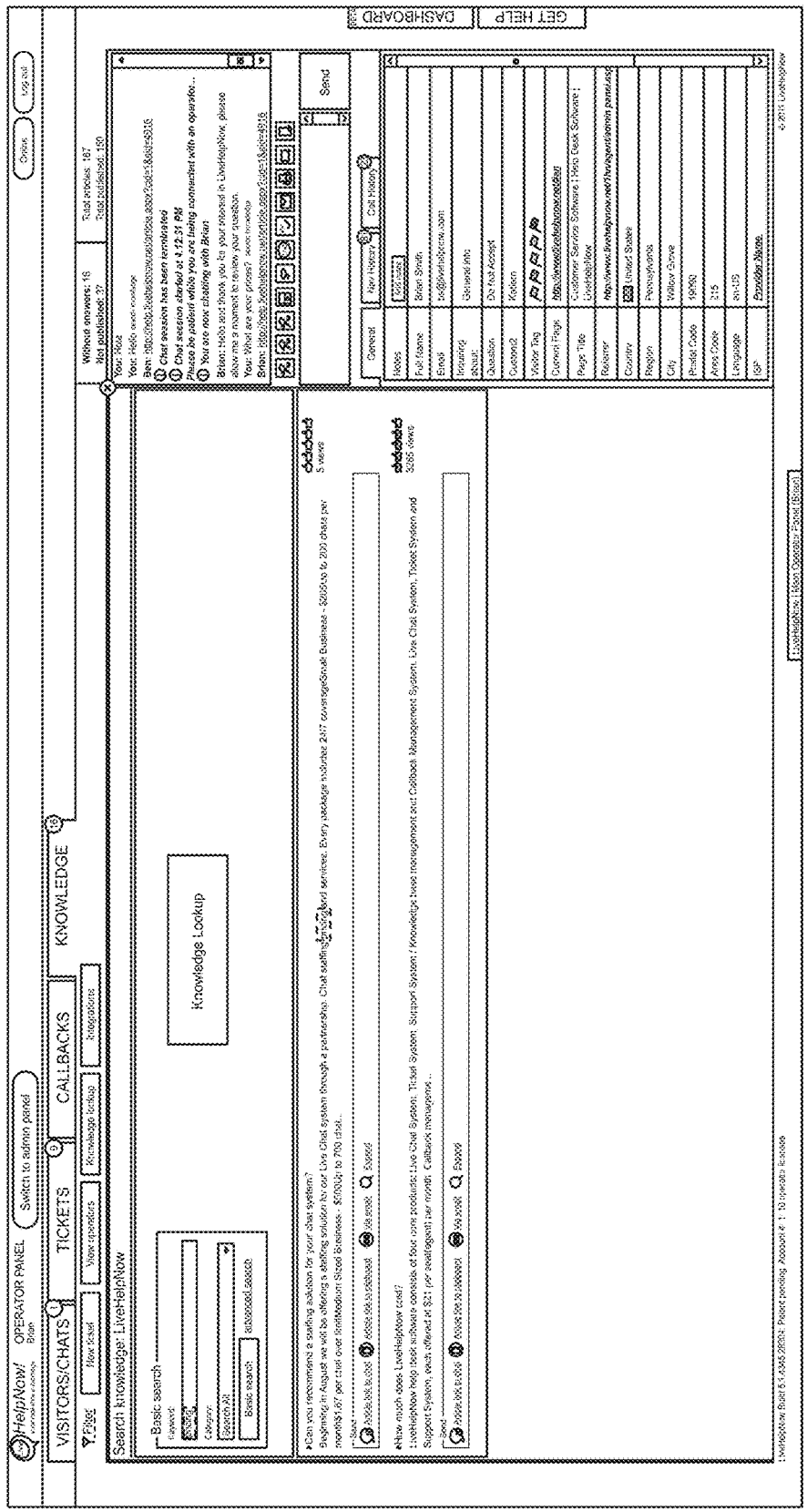

Exemplary embodiments of the present invention are described below with reference to the drawing figures showing illustrative examples of structure and functionality through screen captures of a user interface at different stages or modes of operation. Such exemplary implementations are not intended to limit the scope of the present invention, which is defined in the appended claims.

Thus, the matters defined in the following description, such as a detailed construction as well as certain terminology and elements, are provided to assist in a comprehensive understanding of the invention not to limit the scope thereof. Accordingly, those of ordinary skill in the art will recognize that various changes and modifications of the embodiments described herein can be made without departing from the scope and spirit of the invention. Also, well-known functions or constructions are omitted for clarity and conciseness.

Exemplary embodiments of the present invention provide methods, systems and apparatuses for monitoring and conducting real-time communication over a communication network using computer implemented web-based interactive sessions with visitors to a website through features (which are described in more detail below) such as live chat, email-ticket queue support, and self-service (internal and external) knowledge base.

According to exemplary implementations of the present invention real-time interactive communication and support incorporate a computerized live chat system according to embodiments of the present invention installed with any website or Internet/Intranet application, providing at least the benefit of answering client/customer inquiries via a live chat session on a computer (for example, PC, Mac, or mobile communication device). Further, exemplary implementations for the present invention provide for incorporating billboard advertising along with a live chat session with a visitor to a website where a visitor can be a client/customer of the website's owner, agent or operator.

Thus, exemplary embodiments and/or implementations of the present invention relate to novel techniques that organizations can use for their website operators/agents to provide support to clients/customers via a computerized real-time interactive sessions such as live chat, and others in accordance with exemplary embodiments of the present invention as follows.

An exemplary embodiment of the present inventions provides system and method allowing an operator to simultaneously chat with a visitor to the operator's website while responding/submitting tickets/emails and searching through the company knowledge base articles for information.

Referring to FIG. 1, an example of a graphical user interface according to an embodiment of the present invention provides a main operator panel 100 exemplifying multitasking. An operator can monitor activity of visitors and/or chats in real time. For example, the panel provides for chatting 108 with multiple clients/customers 102 concurrently, with, for example, tickets 104, emails and search or update, and/or updating the company knowledge base 106 simultaneously. The live chat enables file transmission, chat transfer and remote assistance with greater ease than traditional systems. The operator panel features a public API which allows for full integration with third-party systems.

According to an exemplary implementation, the ability to chat with visitors/customers is provided to operators simultaneously as they use any or every software module including the ticket, callback, and knowledge base modules.

For example, as an operator replies to a ticket using the ticket module, the chat window remains on-screen so that an ongoing chat session can be maintained while answering tickets. Tickets can also be created on the fly as an operator chats with a visitor/customer using the "New ticket" button. Within the "New ticket" window there is a link provided that allows operators to transfer the contents of the current live chat session into the body of the ticket with one click. The chat window remains in the same location across the operator panel in all modules, allowing the operator to multi-task.

According to another example, operators can manage multiple chat sessions within the visitors/chats module using color-coded status icons that indicate whether a visitor/customer is currently browsing (gray), waiting for chat (red), waiting for operator response (yellow), operator waiting for visitor response (green), or has previously chatted/has been invited to chat by an operator (blue). During active chat sessions the waiting for operator response (yellow) & operator waiting for visitor response (green) icons are utilized to focus an operator's attention on visitors/customers who are waiting for the operator's response, allowing the operator to switch between chats efficiently and multitask.

According to yet another example, knowledge base articles are created using a built-in rich text editor and content management system. Articles may include text, hyperlinks, images, and video content and are published in a question and answer format. Knowledge base articles can be organized by category, can be searched by operators, and can be published online for visitors/customers to browse or stored as private articles for operators to use internally. All knowledge base articles can be searched in real time by operators using a "knowledge lookup" button accessible from any module in the operator panel. The knowledge base articles presented to operators in the "knowledge lookup" window after a running a search can quickly be linked to visitors/customers engaged in a chat session using the "Article link to chat" link located below each article excerpt. This allows operators to give visitors/customers quick access to expert knowledge so they can handle multiple difficult inquiries at the same time.

According to yet another example, operators also have the ability to search the knowledge base directly within active chat sessions and tickets. Every message a visitor/customer sends to an operator in a chat session can be looked up in the knowledge base using a "search knowledge" link that is appended to visitor/customer responses. This "search knowledge" link is also available to operators as they respond to visitor/customer tickets. This functionality serves to speed up the support process, allowing operators to quickly enter a query into the knowledge base without typing out any text.

Referring to FIGS. 1b-1g, according to an exemplary implementation of the present invention, the following features are provided as part of a user interface:
1. Operator Panel—location of chat window (visitors/chats tab).
2. Location of the chat window (tickets tab).
3. "New ticket" button location.
  a. "Get from chat" link.
4. Location of the chat window (knowledge tab).
5. Knowledge base text/content editor.
6. "Knowledge lookup" button location.
7. Knowledge lookup window.
  a. "Article link to chat" link.
  b. Article link inserted into the chat window.
8. Show the "search knowledge" link in the chat window and the ticket window.

Another exemplary embodiment of the present inventions provides system and method allowing implementation of a whisper technology, or ability for operator to communicate (or, "whisper") a message to another operator directly in the active chat session, this message will remain hidden to the visitors/customers. Whisper technology is a coaching tool which may be used to train newly hired operators more quickly than traditional methods would allow. It also provides the ability for expert operators to "chime in" on the chats of less experienced operators who, for example, may not have the skills required to answer complex visitor/customer inquiries in full detail.

Figure 2A:
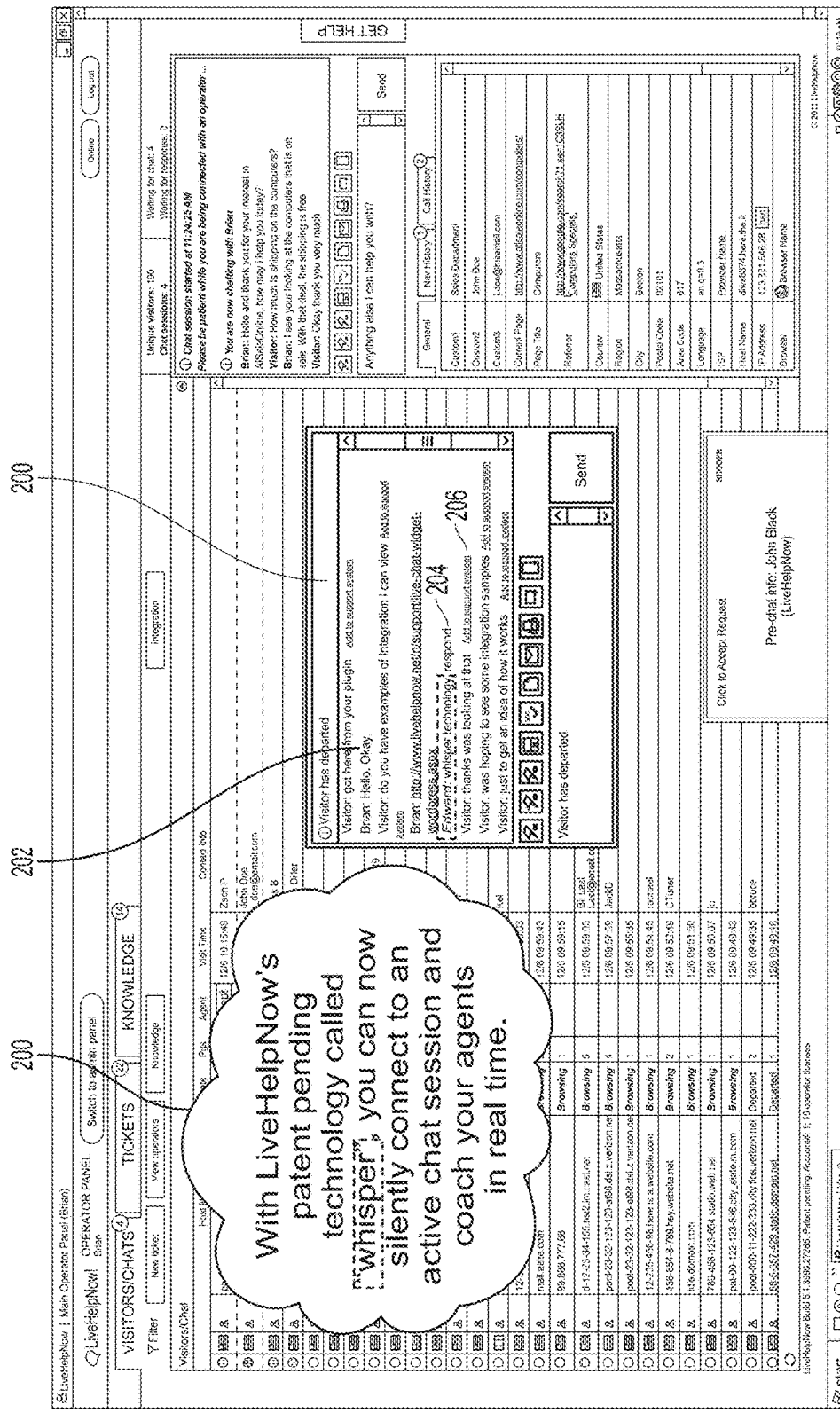

Referring to FIG. 2a, an example of a graphical user interface providing an exemplary implementation of whisper technology module 200, according to an embodiment of the present invention, which allows a silent (without alerting website's visitor) connection of a coach 204 with operators/agents 202 in real time while the operator/agent is on a chat with a visitor (for example a client/customer) 206. A non-limiting advantage of the whisper feature is to facilitate training of an operator/agent during a live chat session with minimal interjection from the coach/trainer.

According to an exemplary implementation, any operator can send a whisper to another operator by selecting a chat session that is not assigned to them and typing a message into the chat box then sending it. The operator receiving a whisper will see the text from the message included in-line with the messages normally sent between the operator and the visitor/customer in the chat box.

According to yet another exemplary implementation, whisper messages are highlighted to distinguish them from other messages, and a "respond" link is appended to every whisper so that the operator receiving whispers can easily reply to the operator sending whispers using an "internal chat window".

Figure 2B:
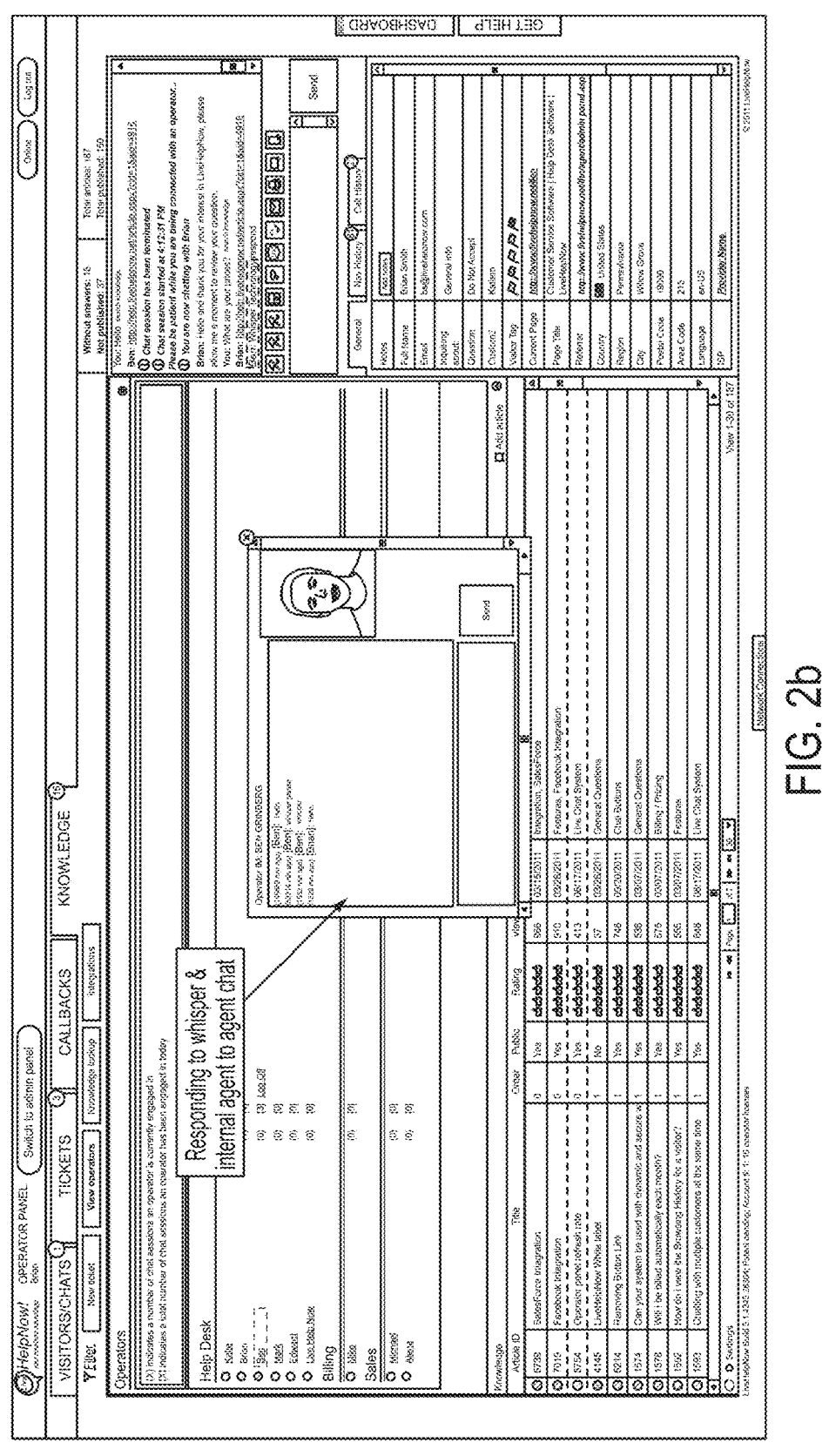
Figure 2C:
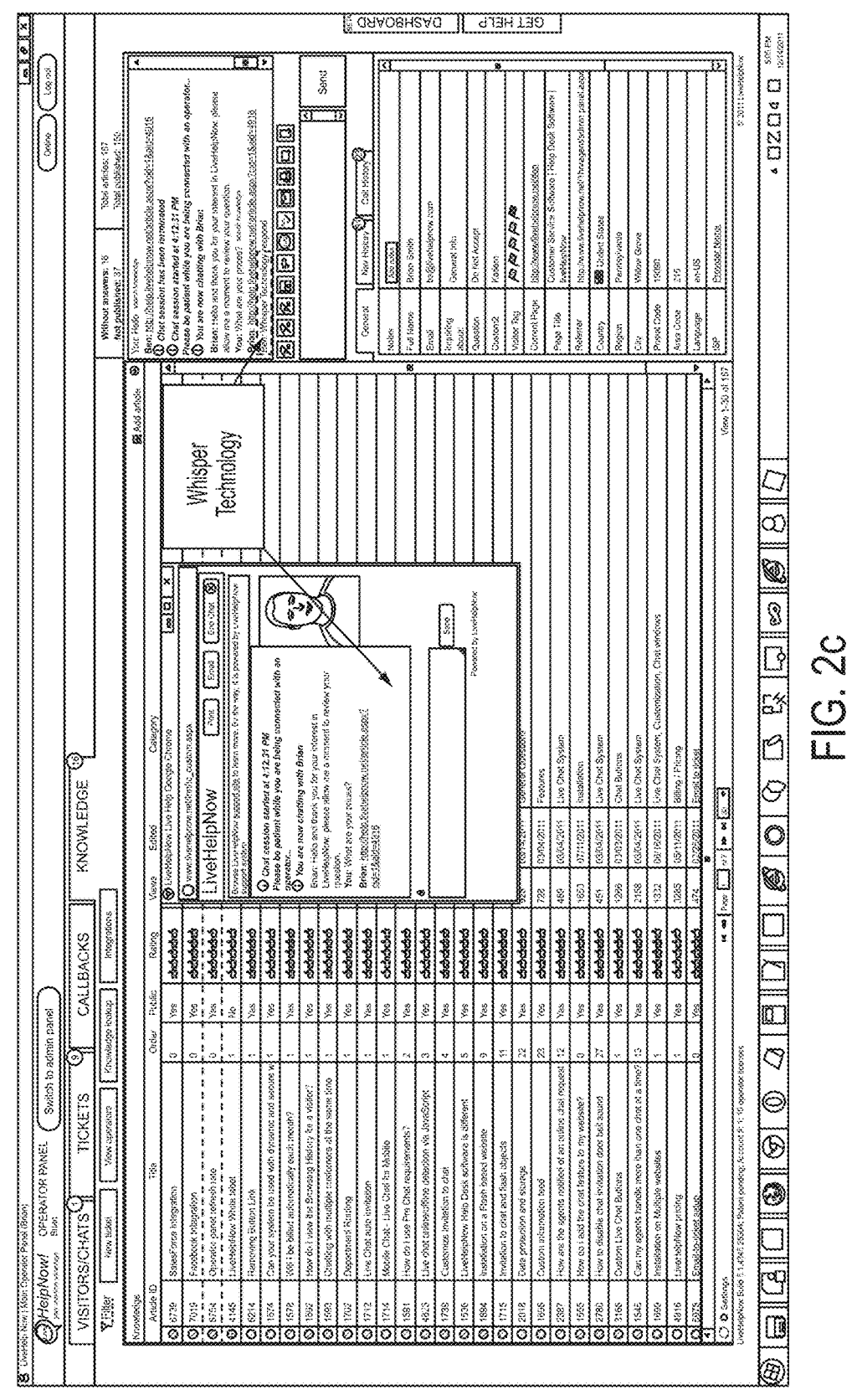

Referring to FIGS. 2b and 2c, according to an exemplary implementation of the present invention, the following features are provided as part of a user interface:
1. Receiving a whisper (highlighted text and the respond link).
2. Responding to a whisper (internal chat window).

Yet another exemplary embodiment of the present inventions provides system and method for facilitating billboards, or an ability to display a series of scrolling advertising messages to visitors/customers within the chat window during active chat sessions.

Figure 3:
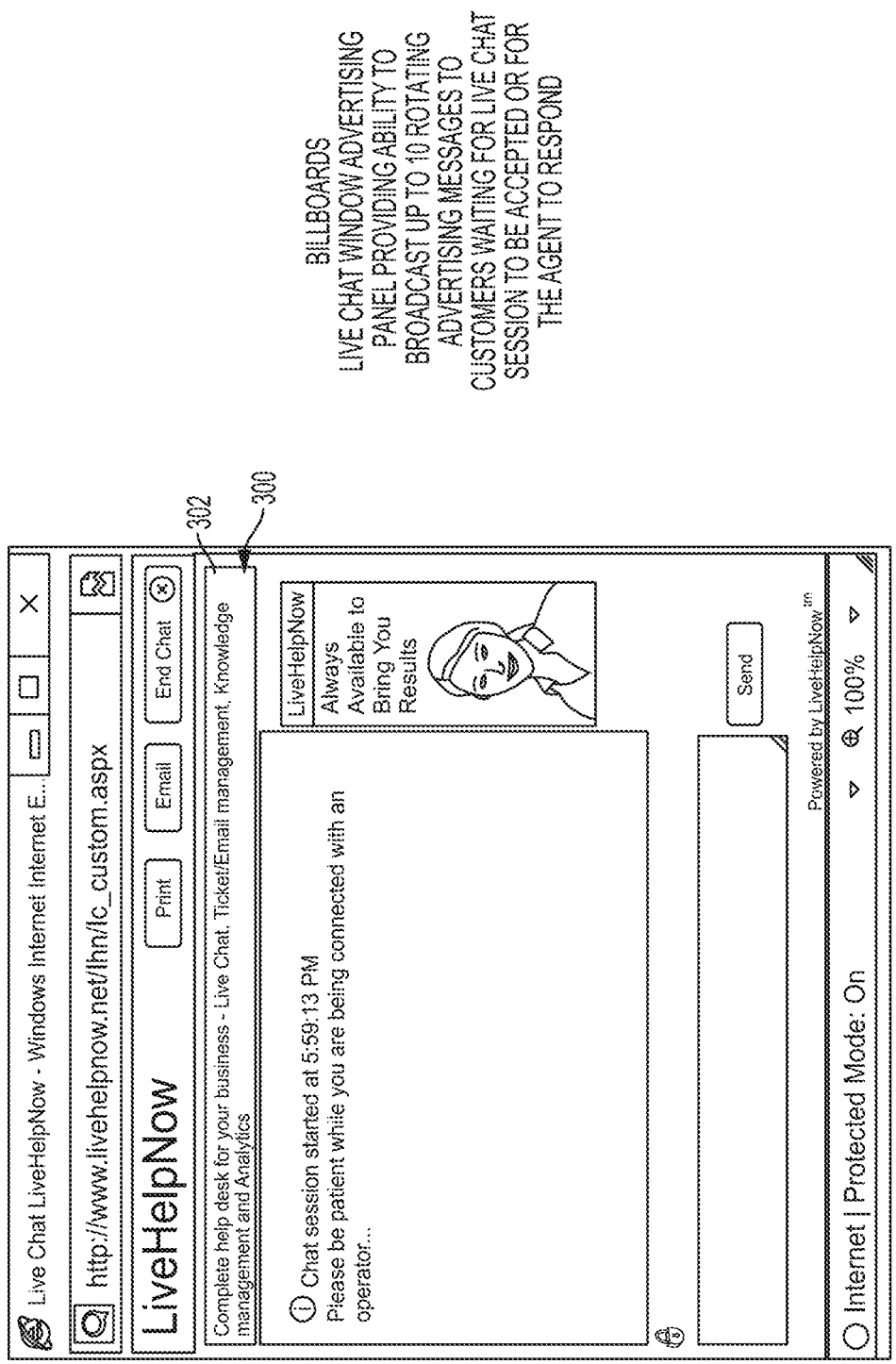
FIG. 3 is an illustrative example of a graphical user interface and underlying computer-implemented functional modules facilitating a billboard feature according to exemplary embodiments of a system and methodology of the present invention.

Referring to FIG. 3, an example of a graphical user interface provides a billboard advertising panel 300 for live chat between an operator/agent and a client/customer, according to an exemplary embodiment of the present invention. Further, exemplary implementations for the present invention provide for incorporating billboard advertising along with live chat with a client/customer. For example, a billboard live chat window advertising panel provides up to 10 rotating advertising messages to client/customers waiting for live chat session to be accepted or for the agent to respond, according to an exemplary implementation of the present invention.

In an exemplary implementation, billboard messages are text-based, but they may also include clickable hyperlinks. Clickable "Banner ads" with custom graphics may also be displayed in place of text-based Billboard messages.

As illustrated in FIG. 3, according to an exemplary implementation of the present invention, certain features provided as part of a user interface include billboard messages 300 in a chat window 302. These messages including, for example, a text based portion with a link, and implemented as a banner ad.

Yet another exemplary embodiment of the present inventions provides system and method for knowledge base intelligent growth which allows operators to add articles directly into the knowledge base module by clicking on a link in a chat session and within ticket entries. This visitor/customer-generated content grows the knowledge base and adds to its utility.

Figure 4A:
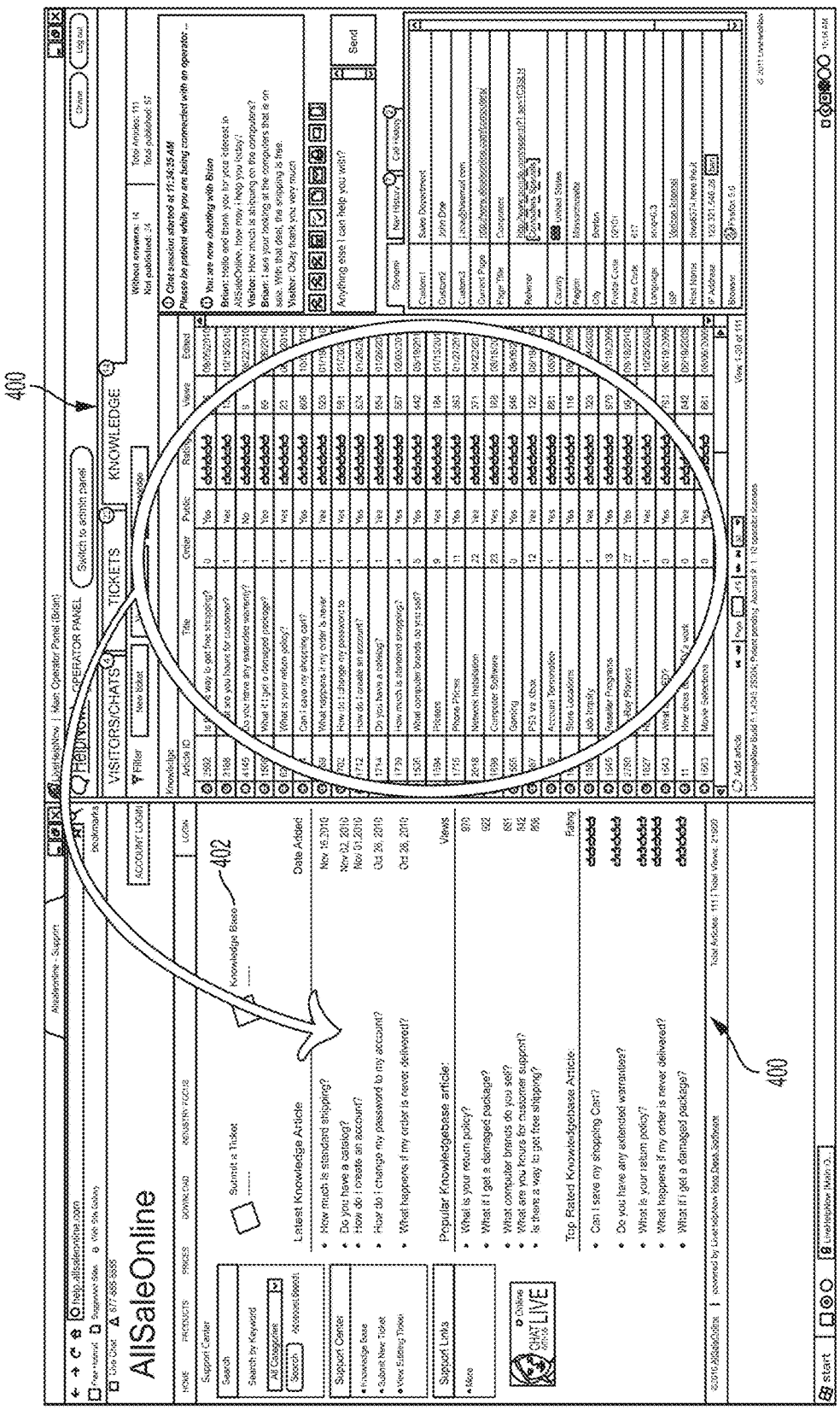
Figure 4B:
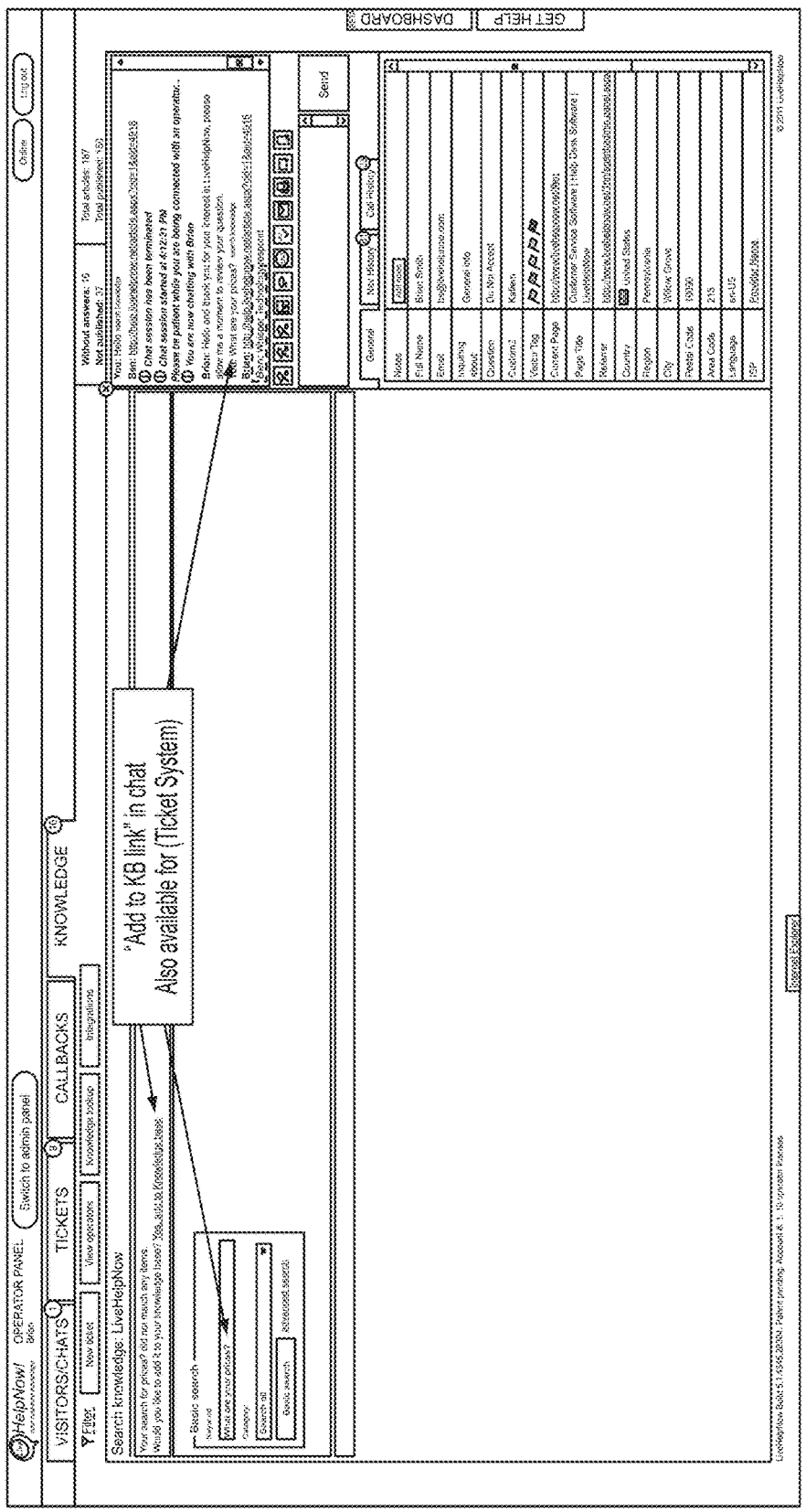
Figure 4C:
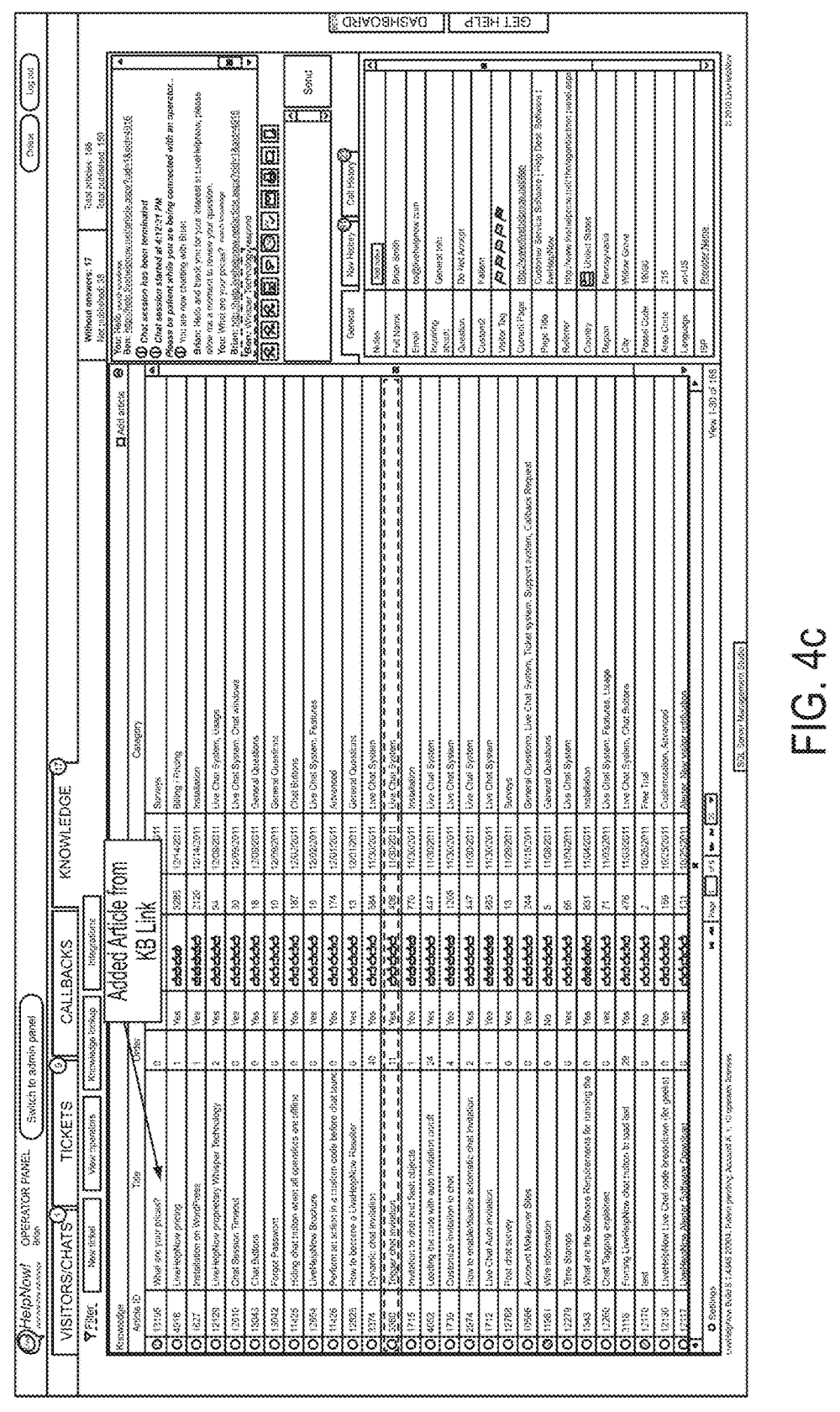
Figure 4D:
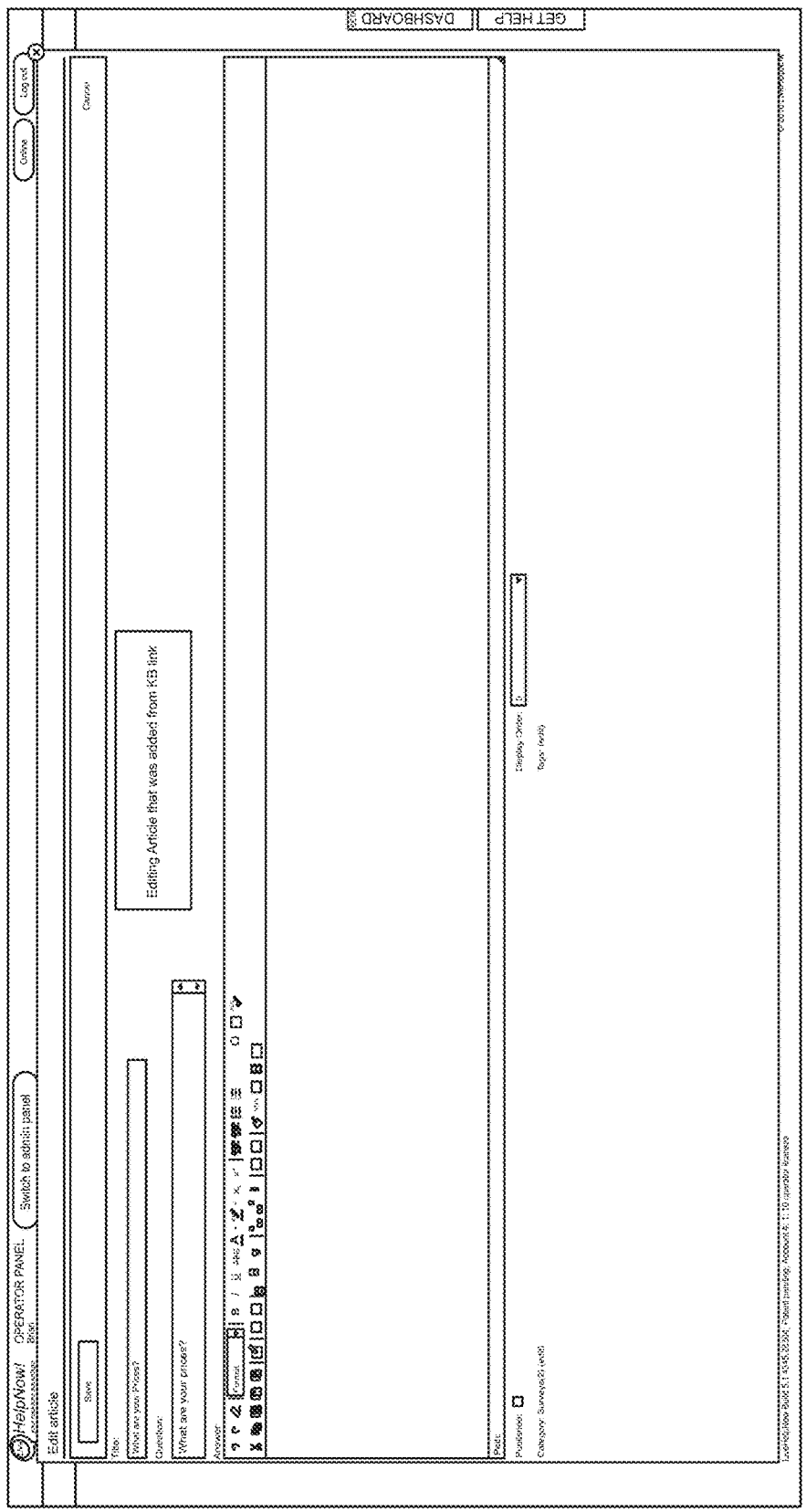
Figure 4E:
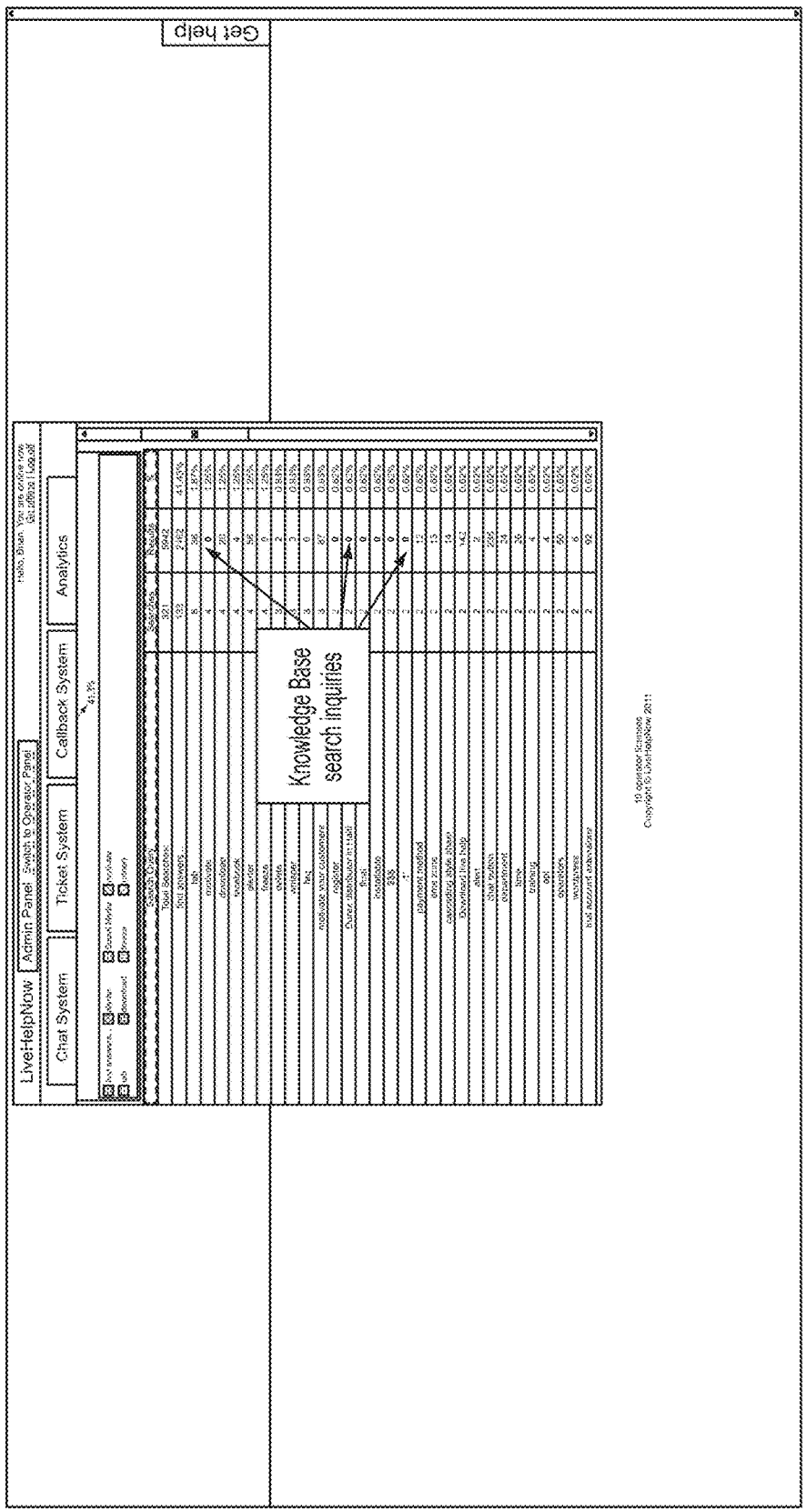

Referring to FIG. 4a, an example of a graphical user interface providing for knowledge base information 400 between an operator/agent and a client/customer, according to an exemplary embodiment of the present invention. Exemplary implementations of the present invention provide for decreasing a company's customer call volume by publishing searchable and brandable frequently asked questions (FAQ)/knowledge base. For example, customers can find answers without initiating a customer service inquiry by accessing knowledge base 402. The knowledge base can grow directly from live chat sessions, tickets and/or information added manually according to exemplary implementations of the present invention.

According to an exemplary implementation, knowledge base intelligent growth is available to operators using the chat and ticket modules. Clicking the "add to knowledge base" link creates a knowledge base article with the content from the chat session or ticket copied into it. The new knowledge base article can then be edited and published onto a website or stored for internal purposes using the built in content management system in the knowledge module.

According to another exemplary implementation, administrators have the ability to generate reports that compile data generated by the system which can allow for to the intelligent growth of the knowledge base. The system tracks every search term used in visitor/customer knowledge base queries along with the total number of times each search term has been entered. The number of results found for each search term query is also displayed. When there are no results returned by a search term, this output is highlighted in a "knowledge base search term report".

Figure 4F:
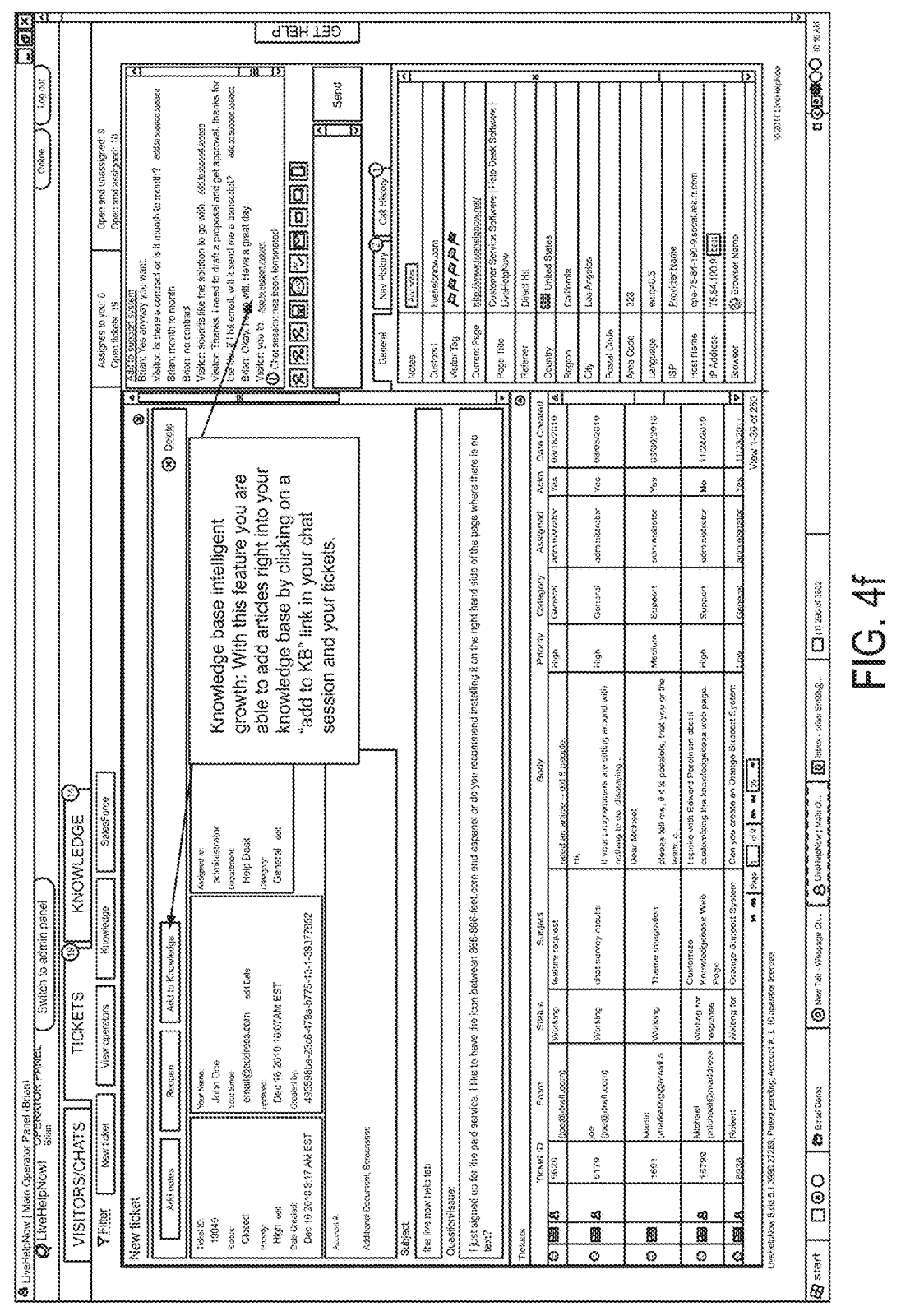
Figure 4G:
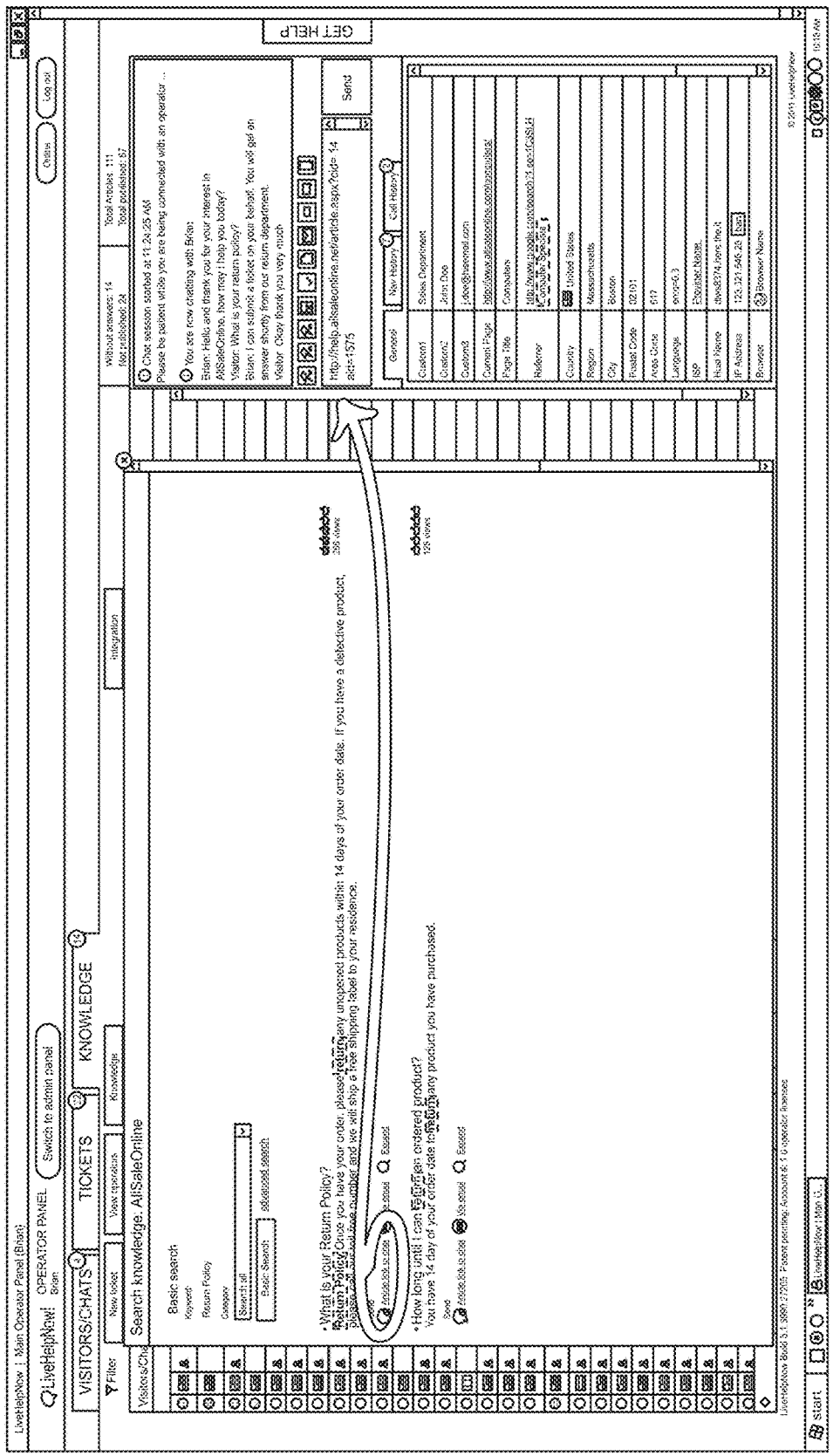
Figure 4H:
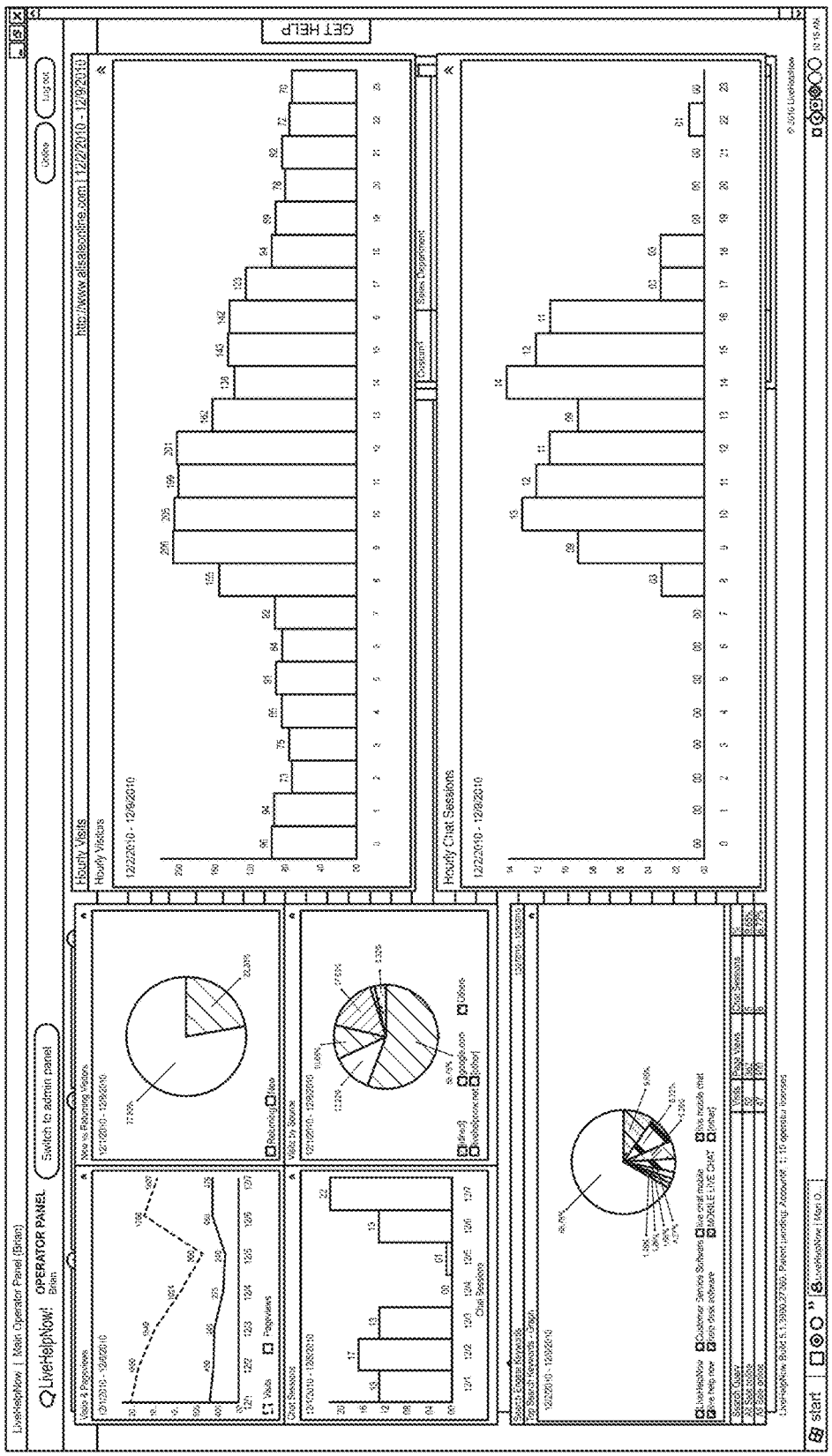

Referring to FIG. 4h, an example of a graphical user interface provides access to the reports related to live chat between an operator/agent and a client/customer, according to an exemplary embodiment of the present invention. For example, exemplary implementations of the present invention provide for real-time monitoring chat sessions/tickets in progress, and further provide for reporting from website traffic analysis to operator/agent productivity.

According to yet another exemplary implementation, the system also has the ability to automatically email reports to a specific administrator/operator containing the results from the "knowledge base search term report" so that the operator can intelligently maintain and expand their knowledge base to meet visitor/customer self-service needs more effectively over time.

Referring to FIGS. 4b-4e, according to an exemplary implementation of the present invention, certain features provided as part of a user interface include:

1. "Add to Knowledge Base (KB) link" in chat.
2. Newly added knowledge base article in the knowledge tab.
3. The same KB article opened in the content management system.

Referring to FIG. 4f, another example of a graphical user interface providing for adding articles into a knowledge base directly from a live chat session between an operator/agent and a client/customer, and/or from a ticket, according to an exemplary embodiment of the present invention, allows an operator to click on "Add to Knowledge" button to add a link from a chat session and/or a ticket.

Referring to FIG. 4g, an exemplary implementation of a graphical user interface provides for searching of a knowledge base while conducting live chat between an operator/agent and a client/customer, according to an exemplary embodiment of the present invention. For example, an operator can search the knowledge base associated with an exemplary system of the present invention, and provide that searched information to a client/customer while engaged in a live chat session.

Yet another exemplary embodiment of the present inventions provides system and method for API Integration, which provides capability to pick up real-time information from a system's website visitor by seeing the content of a visitor's shopping cart or by passing information from the systems' server into the visitor's information located in the operator's panel.

Figure 5:
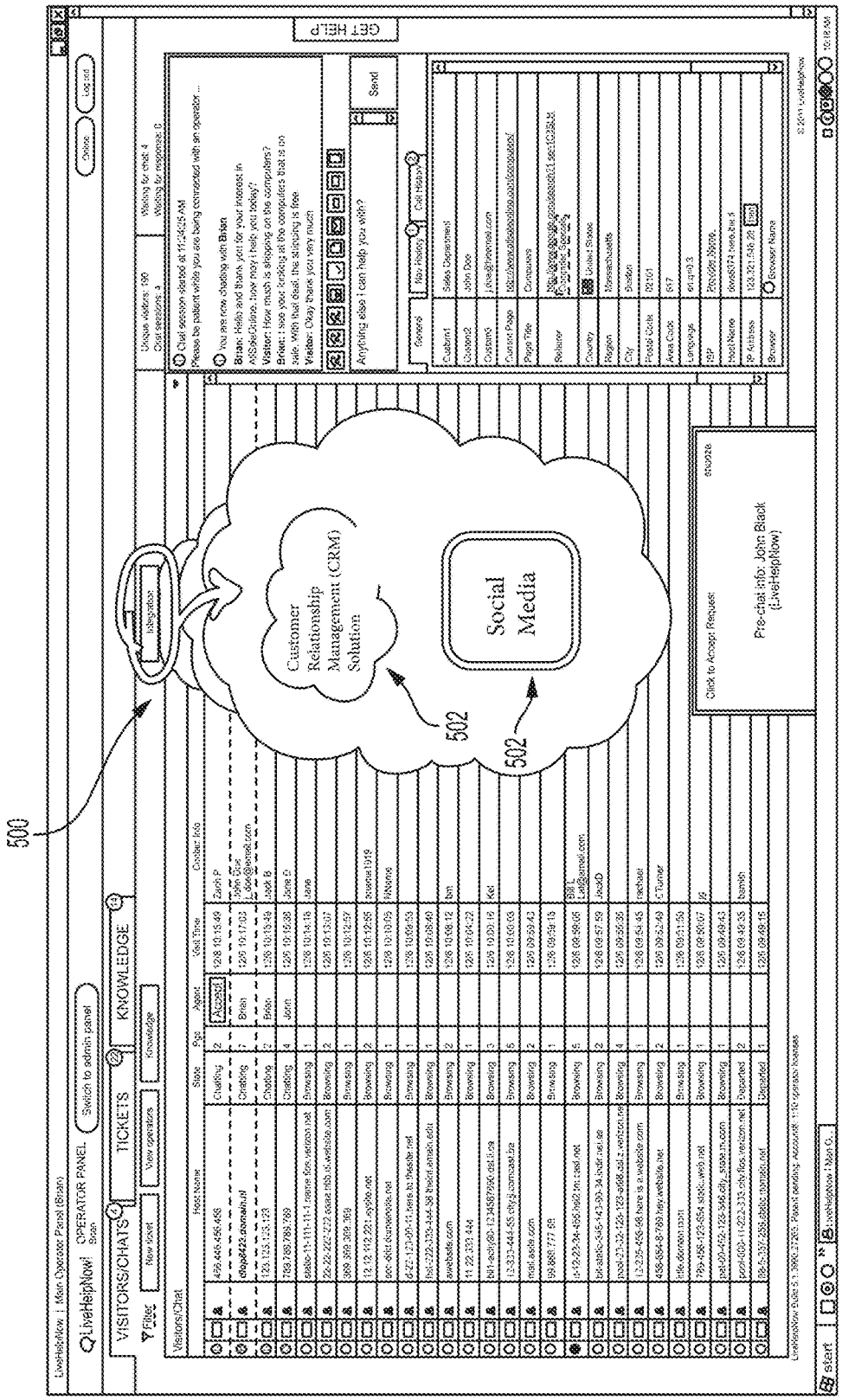
FIG. 5 is an illustrative example of a graphical user interface and underlying computer-implemented functional modules facilitating a third-party system integration feature according to exemplary embodiments of a system and methodology of the present invention.

Referring to FIG. 5, an example of a graphical user interface providing for live chat between an operator/agent and a client/customer where the operator panel can integrate 500 with third party systems 502 via a public API (non-limiting examples of such third party systems include Sales-Force and Facebook), according to an exemplary embodiment of the present invention.

Yet another exemplary embodiment of the present inventions provides system and method for generating and maintaining a history of past activity (or call history), where, for example, when selecting a visitor/customer in the visitor grid, viewing a ticket, or viewing a callback, the operator has the ability to see all previously submitted tickets, chat sessions and callbacks for the selected visitor/customer.

According to an exemplary implementation, when a visitor/customer entry in the visitor grid, ticket module, or callback module is selected by an operator the call history for that visitor/customer automatically becomes accessible using the "call history tab" located under the chat window.

According to another exemplary implementation, when an operator selects the call history tab, a history of every interaction on record with the currently selected visitor/customer is listed. This list can include, for example, chats, tickets and callbacks.

According to yet another exemplary implementation, entries in call history list the date and time of every past interaction with the current visitor/customer and links are provided to view the archived chats, tickets and callback entries associated with the call history entries.

According to yet another exemplary implementation, call history is generated by searching a customer database for the visitor/customer IP address, email address, host name, and cookies from previous sessions.

Figure 6:
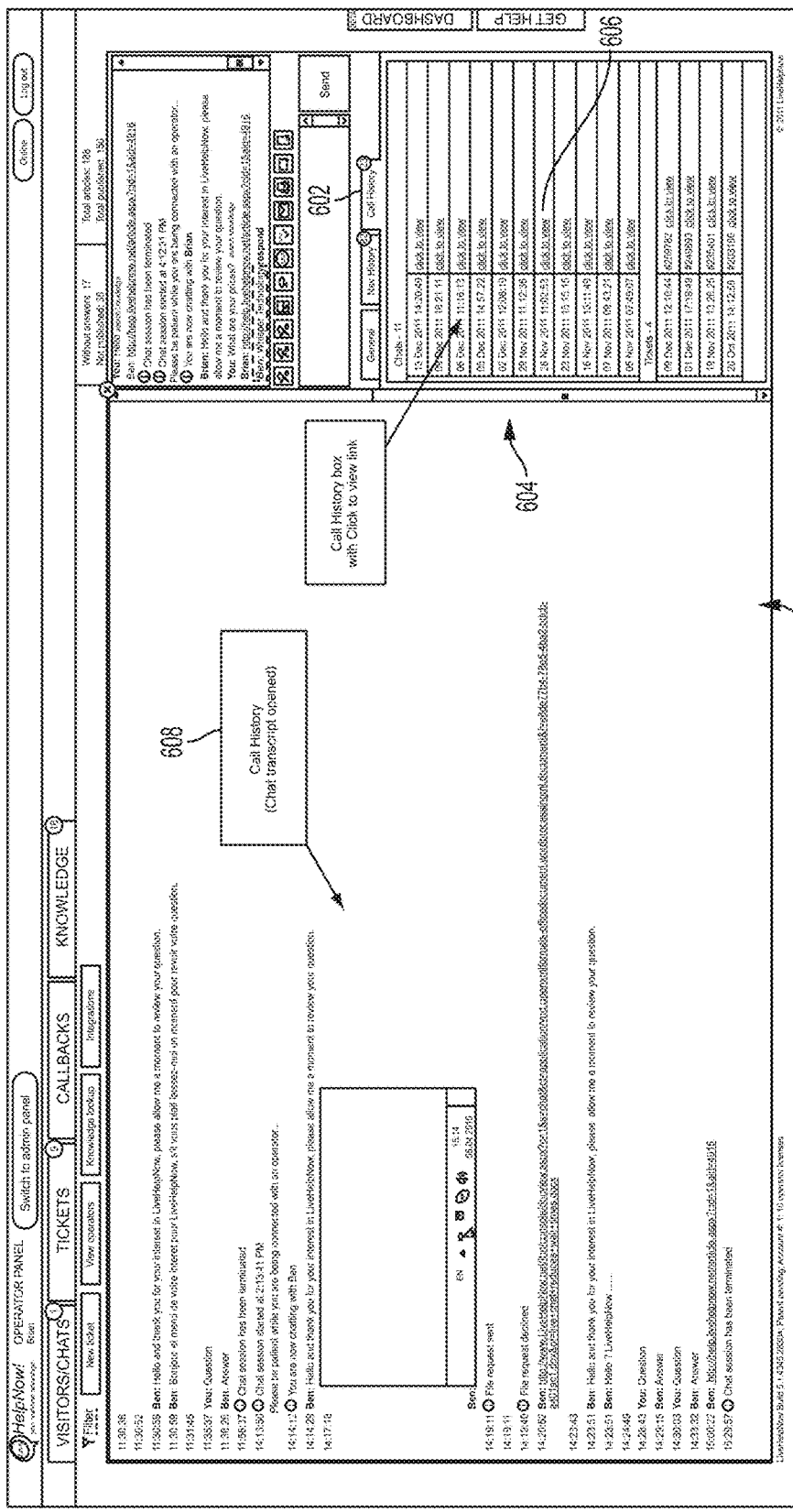
FIG. 6 is an illustrative example of a graphical user interface and underlying computer-implemented functional modules facilitating a call history feature according to exemplary embodiments of a system and methodology of the present invention.

Referring to FIG. 6, according to an exemplary implementation of the present invention, certain features provided as part of a user interface in an exemplary implementation of a call history feature according to an embodiment of the present invention include:

1. An operator panel 600, with the call history tab 602 showing a number of chat and ticket records 604. (In an illustrative, non-limiting example, the cursor should be resting over a "click to view" link 606.)
2. An opened call history entry, showing an archived transcript. (608)

Yet another exemplary embodiment of the present inventions provides system and method that include multiple chat windows, which facilitates the ability to create and brand multiple chat windows and selectively link all or some them to the same account. This allows one company/set of operators to service multiple websites/brands or to present a different window to visitors/customers depending on the department selected.

Figure 7A:
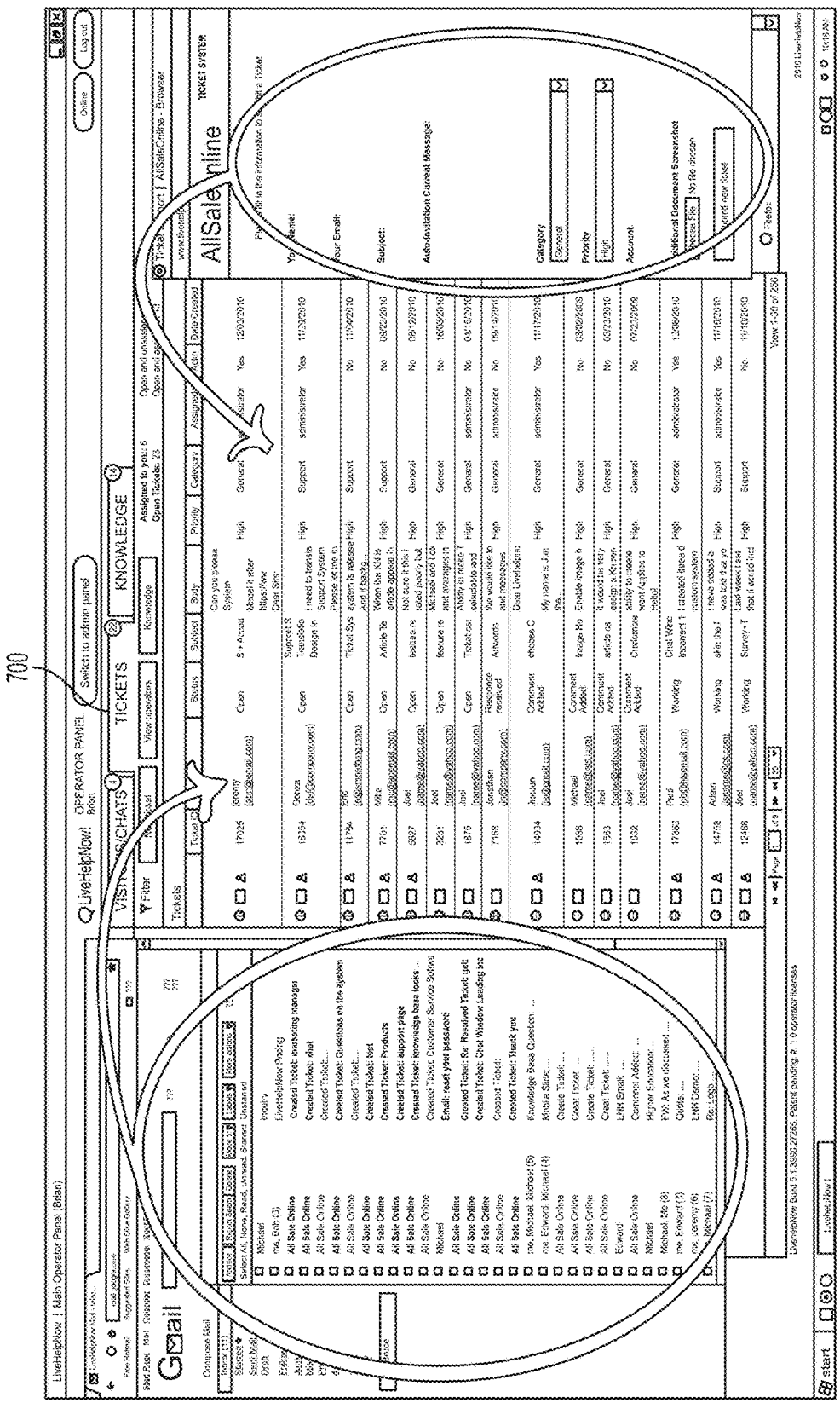
Figure 7B:
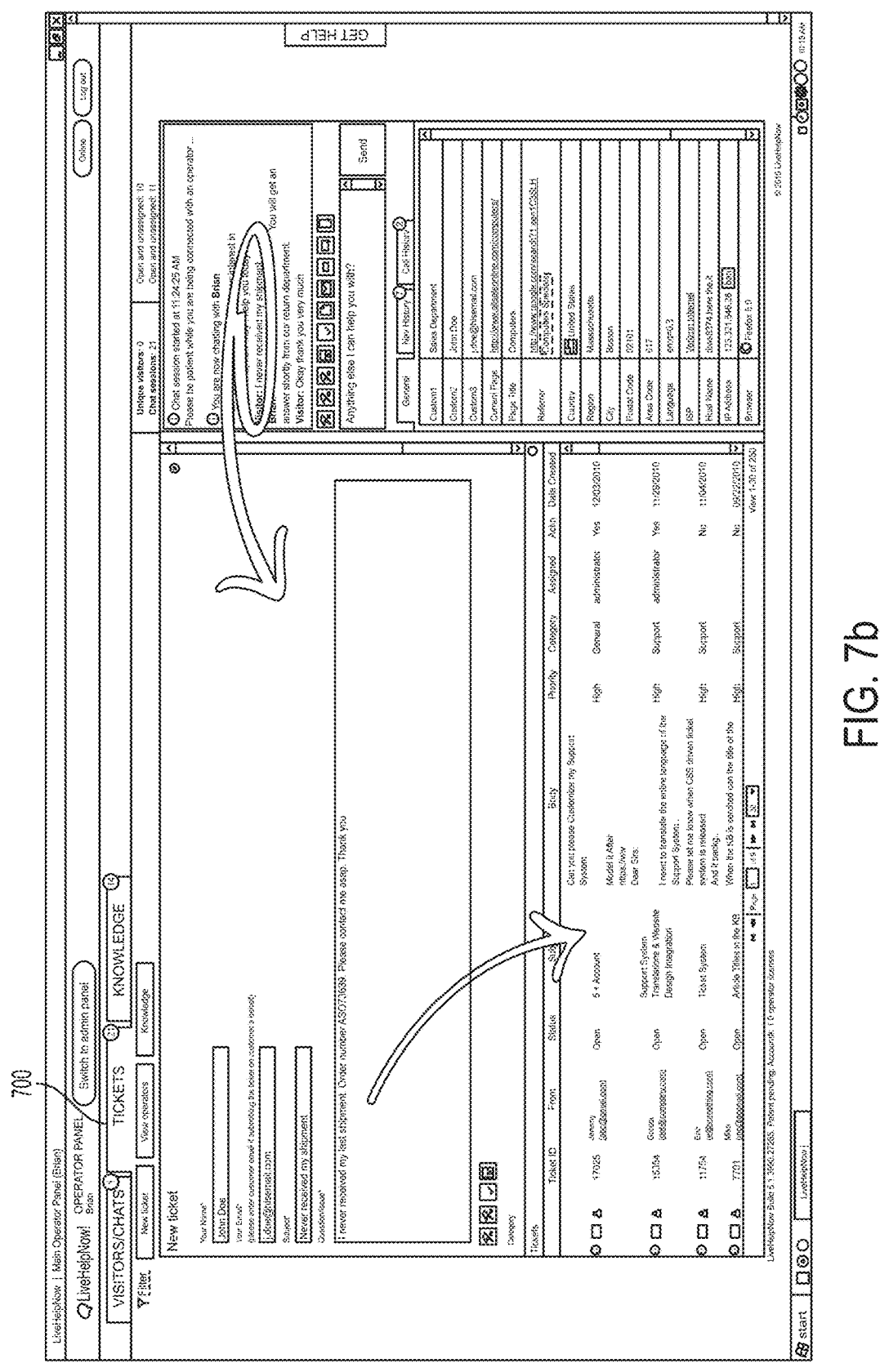

Referring to FIGS. 7a and 7b, example of user interfaces provide for managing tickets 700, according to an exemplary embodiment of the present invention. For example, exemplary implementations of the present invention provide for assigning, queuing and prioritizing customer inquiries arriving via email or web page. Other exemplary implementations of the present invention provides for an email-ticket management system to facilitate organization of emails. Yet other exemplary implementations of the present invention provide for responding to a visitor's inquiry even if unable to do so while in a live chat by creating a follow-up ticket on behalf of the client/customer (visitor) for other agents/operators/departments to responds.

According to an exemplary implementation, each website can have its own unique branding and the chat window for each website can reflect this branding. Each company department can have its own priorities and the chat window that department utilizes can be customized to reflect those priorities.

According to another exemplary implementation, chat windows can be added and modified within the administrative portion of the operator panel. Each chat window can exist on its own and can be tied to any number of click-to-chat buttons, internal departments, and online domains.

Yet another exemplary embodiment of the present invention provides system and method that include chat tagging, which facilitates the ability to tag each chat session and group thusly tagged chat sessions, for example, by any selected or assigned categories.

According to an exemplary implementation, operators are given the option to tag each chat session as they chat with the visitor/customer. The chat tags can be used to, for example, group similar chats together for later review. For example, a company may utilize a "shipping issue" tag to track the effectiveness of their shipping department and log recurring problems so that they can be addressed more completely.

According to another exemplary implementation, operators with administrative privileges can decide what categories can be used to tag chats, and also decide in what order the tags can be displayed to operators.

According to yet another exemplary implementation, chat tags can be displayed to operators in a sliding tab to the left of the chat window. The sliding tab interface can stay visible to the operator until at least one tag is selected for each chat to encourage operators to assign a tag to every chat session. After at least one tag is selected, the operator can minimize the sliding tab. The chat tags selected for a chat session can be represented by colored labels on the minimized sliding tab that correspond to the colors of the chat tag labels on the maximized sliding tab.

Non-limiting examples of categories that can be used according to exemplary implementations of certain embodiments of the present invention include sales inquiry, recurring issue, product/feature request, satisfied customer, and unsatisfied customer.

Figure 8A:
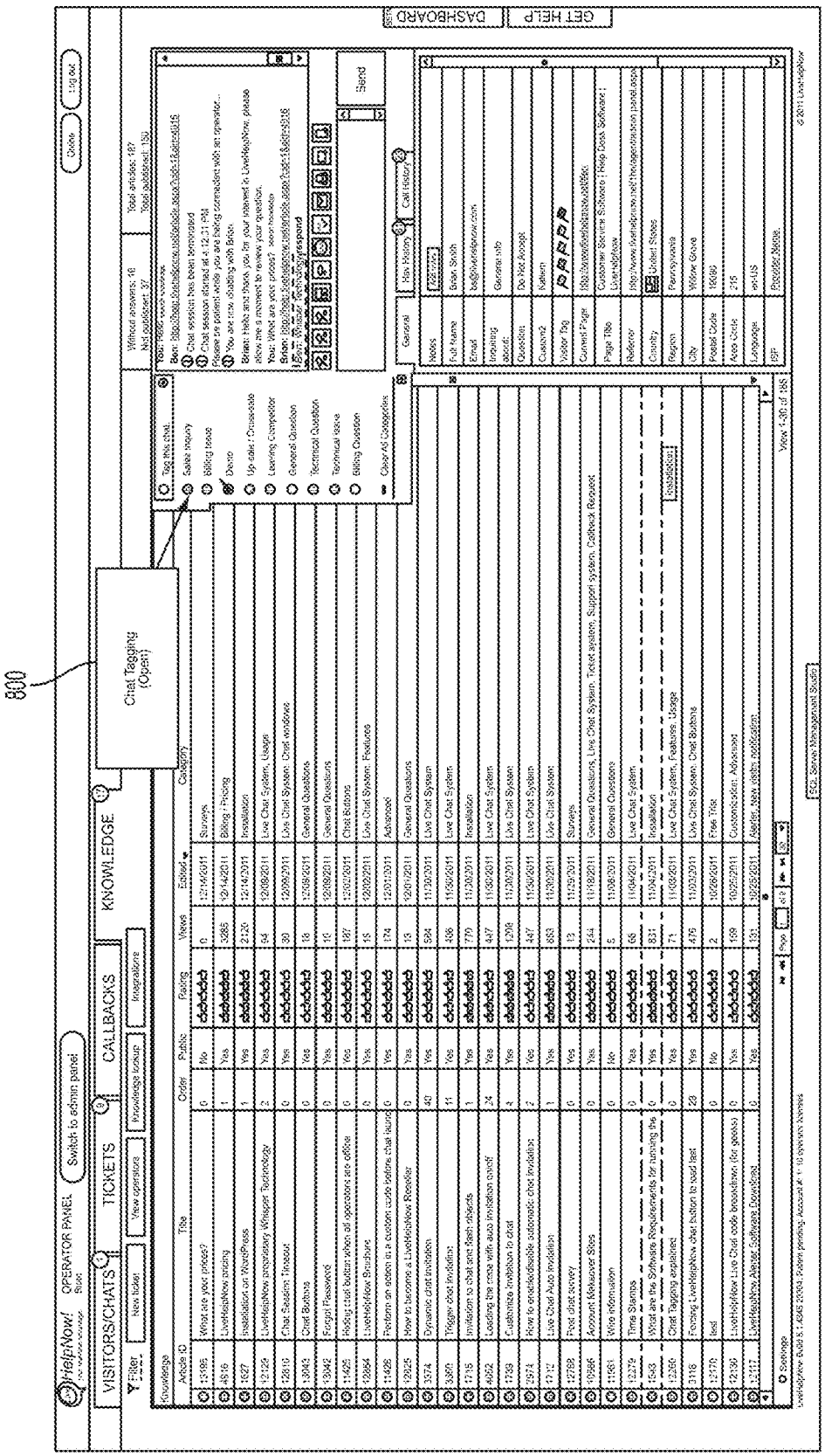
Figure 8B:
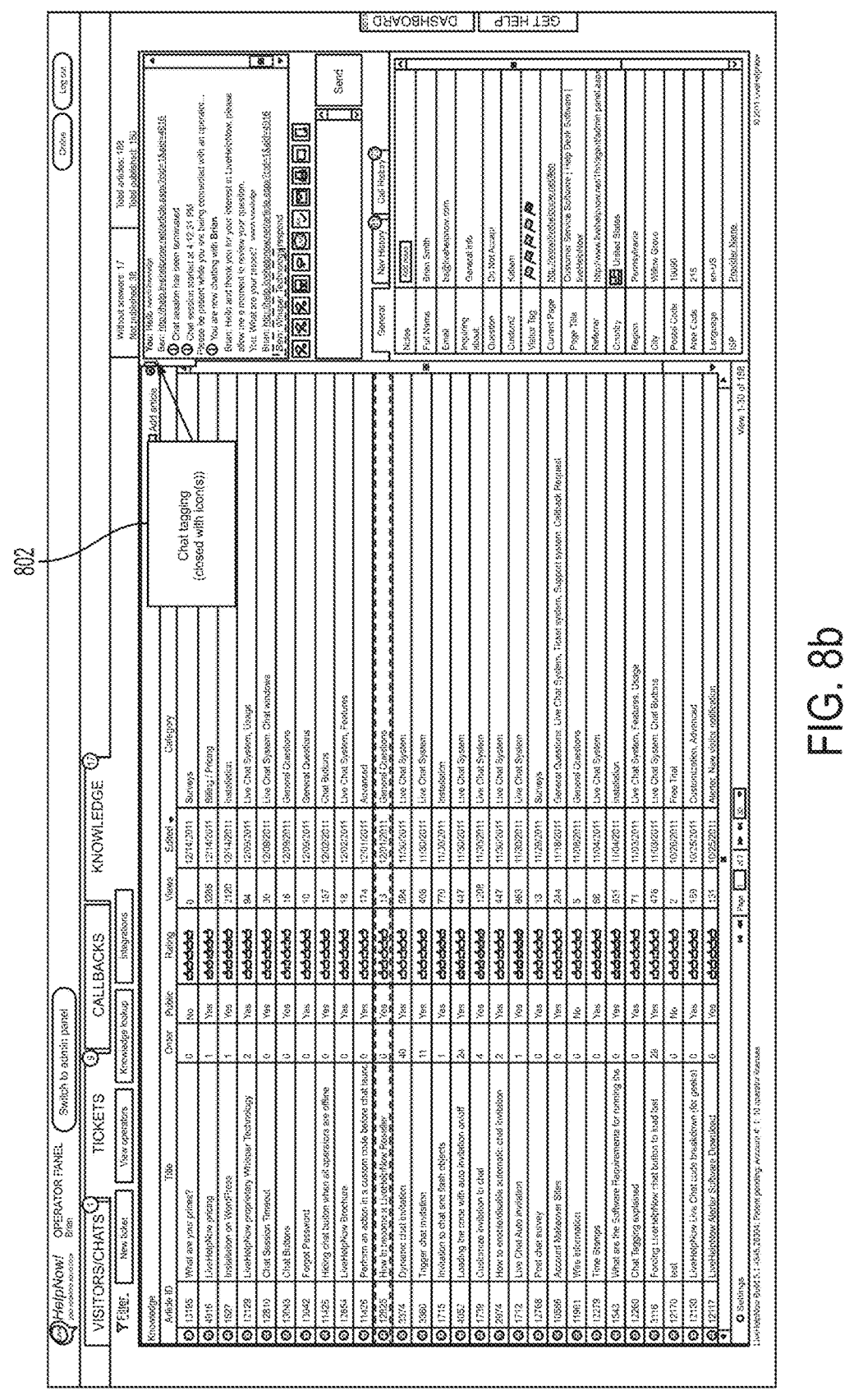

Referring to FIGS. 8a and 8b, according to an exemplary implementation of the present invention, certain features provided as part of a user interface include:

1. Chat tags UI open 800 next to the chat window (with a tag marked).
2. Chat tags UI closed 802 (with same tag marked).

Figure 9:
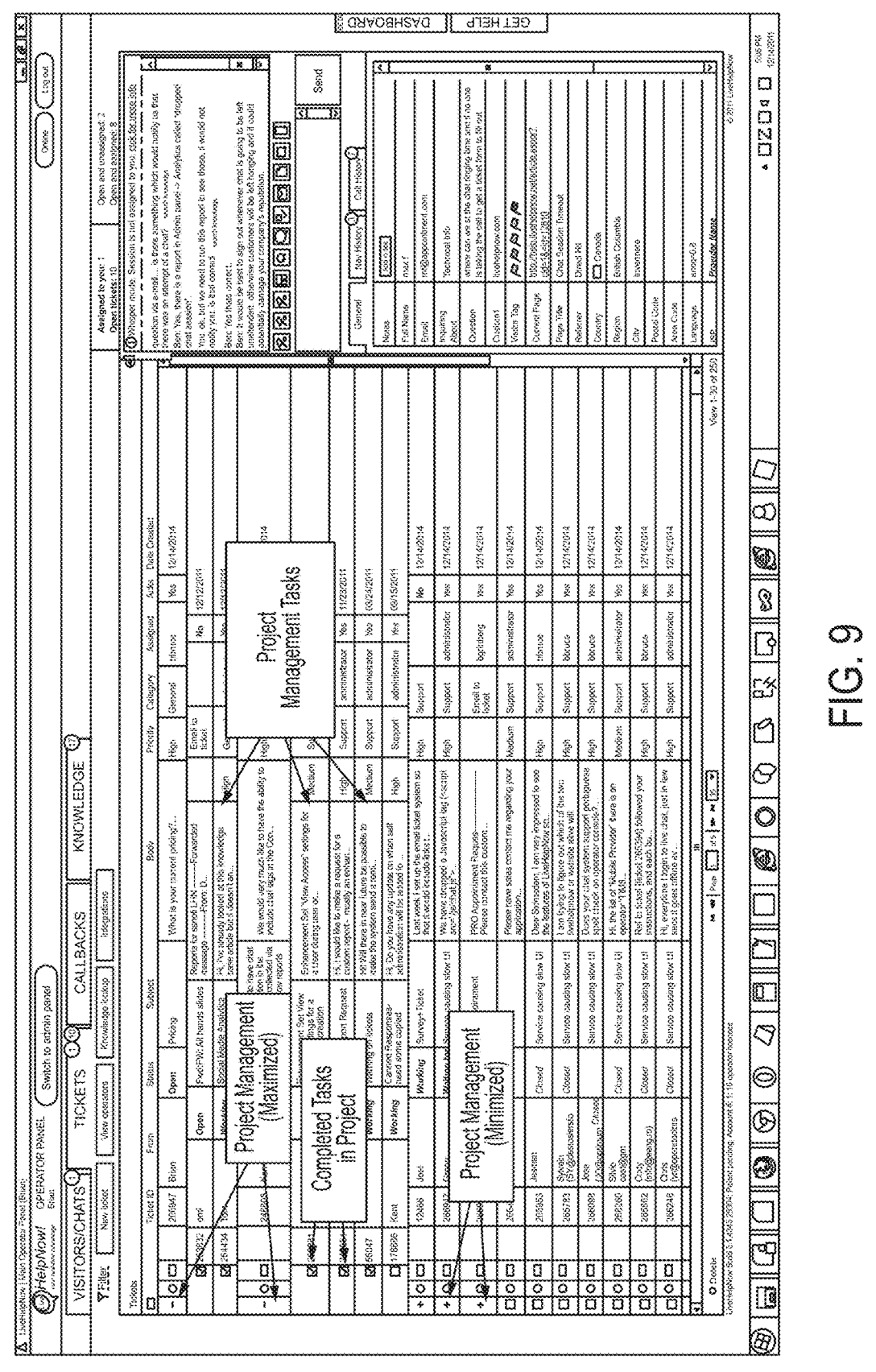

Yet another exemplary embodiment of the present inventions provides system and method including parent-child ticketing for project management, which allows an unresolved ticket to be broken into subordinate tickets to facilitate management of complex tasks. Referring to FIG. 9, for example, an original (or "parent") ticket can be broken into subordinate (or "child") tickets which can then be assigned to other operators to delegate tasks.

According to an exemplary implementation, in order to resolve a parent ticket, every child ticket created must be resolved. For example, operators can have the ability to break up an unresolved ticket, or tickets, into child tickets. Operators can also manage projects by, for example, creating a new "parent" ticket and assigning "child" ticket or tickets to other operators.

According to another exemplary implementation, "child" tickets can be required to be resolved in a selectable specific order. In such a non-limiting example, if "child" tickets are to be resolved in a specific order, then the creator of the parent ticket can assign this order when the parent ticket is created.

According to yet another exemplary implementation, email notifications can be automatically sent out by a ticket module to the operators assigned to "child" tickets when a "parent" ticket is created, and to the creator of a "parent" ticket whenever a "child" ticket is resolved. If, as in the example described above, the "child" tickets must be resolved in a specific order, then email notifications to operators assigned to "child" tickets are delayed until after each one has been resolved.

Yet another exemplary embodiment of the present inventions provides system and method including lead scoring, which assigns a percentage score to each unique website visitor based on a combination of identifiable visitor data and specific visitor actions. For example, a high score can indicate that visitor is a qualified lead, where qualified leads are deemed as more likely to make a purchase. In another non-limiting example, qualified leads' contact information can be passed on to a sales department.

According to an exemplary implementation, a website visitor's can be given a percentage score determined by, for example, assigning values to the visitor's data and actions in a website environment. For example, a visitor may receive 20 percentage points because the visitor is located within a certain geographical region (for example, the United States), and another 20 points when they a visitor submits contact information (for example, in order to receive further communications such as advertising or technical information). In such non-limiting exemplary situations, a lead score can be calculated and assigned to each visitor.

According to another exemplary implementation, operators can customize the scores associated with different visitor actions and characteristics. For example, in a percentage scoring scheme, when a visitor's score reaches 100 percent that visitor can be considered as a qualified lead and that visitor's contact information is passed along to, for example, a sales department along with a percentage breakdown indicative of how that visitor reached 100 percent and was deemed as qualified.

Figure 10:
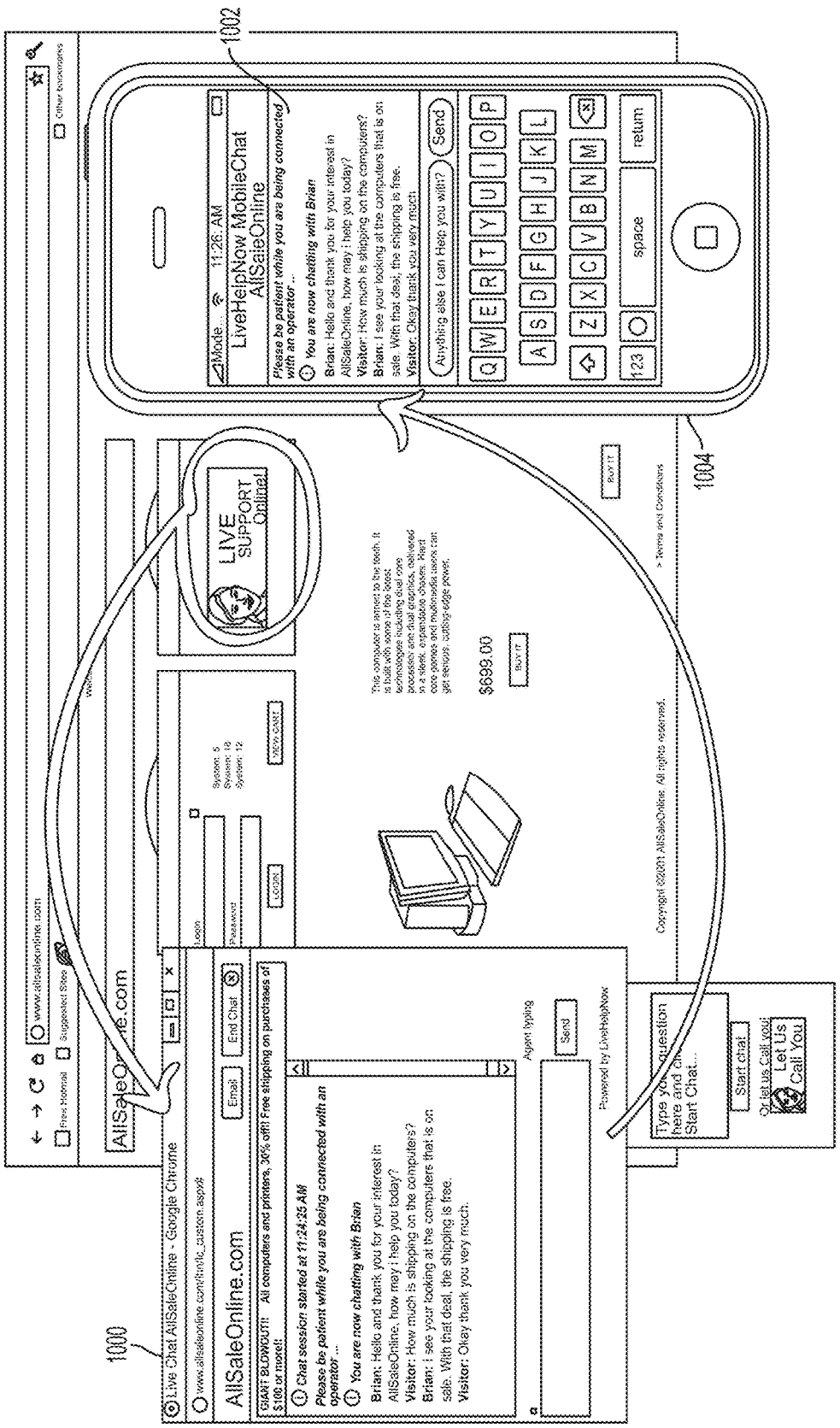
FIG. 10 is an illustrative example of a graphical user interface and underlying computer-implemented functional modules facilitating a mobile connectivity feature according to exemplary embodiments of a system and methodology of the present invention.

Yet another exemplary embodiment of the present inventions provides system and method including mobile live chat between an operator/agent and a client/customer. Referring to FIG. 10, an example of a graphical user interface 1000 provides for mobile live chat 1002 between an operator/agent and a client/customer using a mobile device 1004.

The above-described exemplary embodiments may be implemented as sets of instructions, including program modules to perform various operations on a computing device, stored on non-transitory computer-readable media. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD-ROM disks and DVD; magneto-optical media such as optical disks; and hardware devices that are specially configured to store and perform program instructions, such as read-only memory (ROM), random access memory (RAM), flash memory, and the like. Other media may include a transmission medium such as optical or metallic lines, wave guides, and so on, including a carrier wave transmitting signals specifying the program instructions, data structures, and so on. Examples of program instructions include both machine code, such as produced by a compiler, and files containing higher level code that may be executed by the computer using an interpreter.

Figure 11:
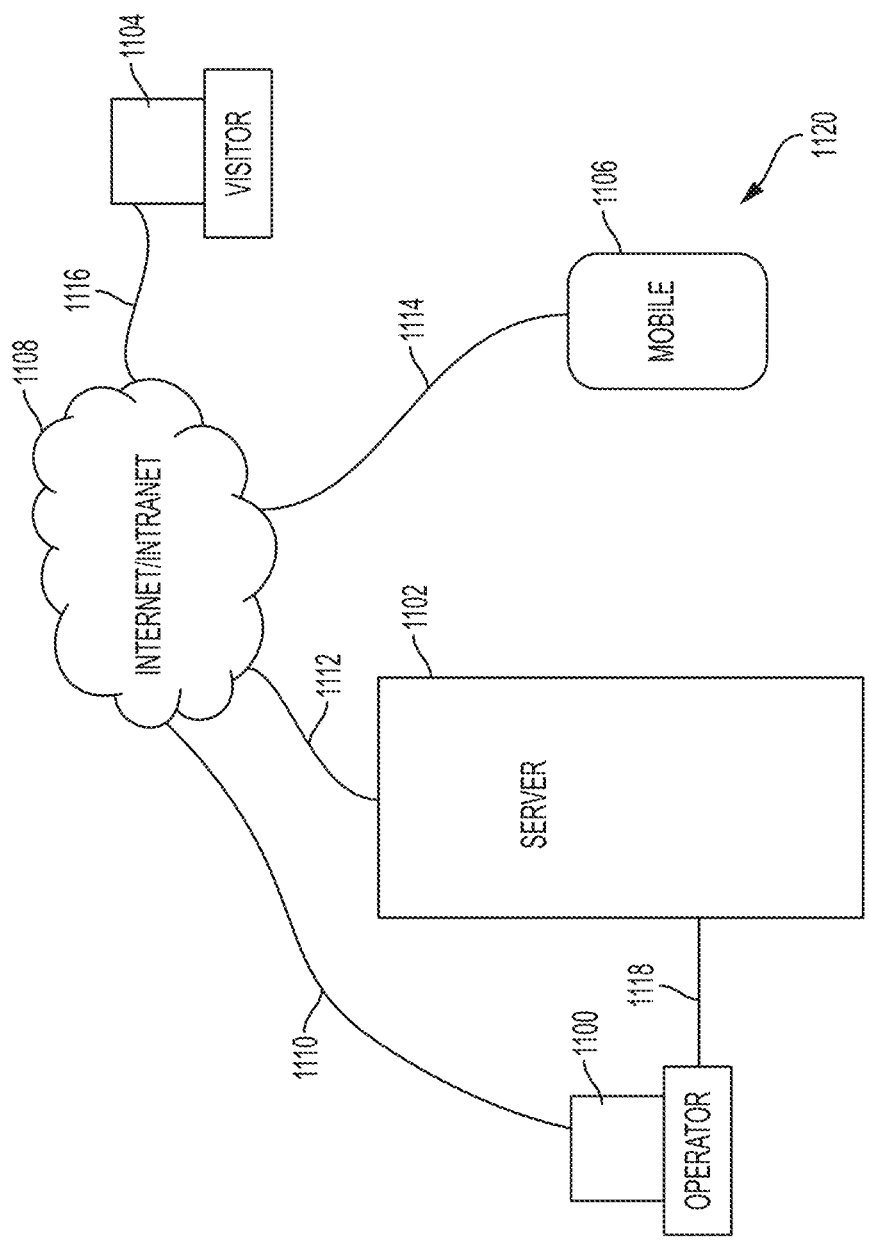
FIG. 11 is an illustrative block diagram of a system and system components implementing functional modules facilitating features and services provided according to exemplary embodiments of systems and methodologies of the present invention illustrated in the non-limiting examples of FIGS. 1a-10.

Referring to FIG. 11, a system 120 illustrating an exemplary implementation of non-limiting embodiments of the present invention can include a computing device 1100 for use by an operator agent connected directly or indirectly 1118 to a server 1102, or connect 1110 via the Internet/Intranet 1108 (which includes but not limited to a wide area network or local area network). Visitor can use a computing device 1104 to connect 1116 to the server 1102 via the Internet/Intranet 1108. A live chat session between a visitor using computing device 1104 and an operator using computing device 1100 is established and conducted as describe above in the exemplary embodiments illustrated in the non-limiting examples of FIGS. 1a-10. In addition, either an operator or a visitor can connect to the Internet/Intranet 1108 using a mobile device 1106 to perform a live chat session as illustrated, for example, in FIG. 3. All of the connections 1110, 1112, 1114, 1116 and 1118 can be wired or wireless (such as Wi-Fi, Bluetooth, Radio Frequency (RF), cellular, and others) as known and understood in the art. The described hardware devices may be configured to act as, or store on their respective non-transitory computer readable media, one or more software modules in order to perform the operations of the above-described embodiments of the present invention as illustrated in the examples of FIGS. 1a-10.

Although exemplary embodiments of the present invention have been disclosed for illustrative purposes, those skilled in the art will appreciate that various modifications, additions, and substitutions are possible, without departing from the scope of the present invention. For example, non-limiting features of various embodiments of the present invention can include:

1. File transfer: While Chatting/Responding to tickets ability to send or receive a file from visitors.

2. Navigation History: Real-time tracking of website pages visitors have seen and are currently on.

3. Multiple domains: Ability to service unlimited websites from the same account.

4. Department routing: Ability to route chat sessions and tickets/emails by department.

5. Real-time Monitoring: Ability to monitor all chat sessions/tickets in progress real time.

6. Customization: Real time customization/branding of customer facing windows with immediate "go-live".

Therefore, the present invention is not limited to the above-described embodiments, but is defined by the following claims, along with their full scope of equivalents.

I claim:

1. A method for instantiating and conducting a chat session between an operator of a website and a visitor over a communication network, the method comprising:
   selectively activating a first window frame on a first computing device of the operator instantiating at least one chat session for receiving real-time first data input from the operator and second data input from the visitor;
   selectively instantiating the at least one chat session on a second computing device of the visitor for receiving real-time the first data from the operator and the second data from the visitor;
   during the chat session, instantiating interactive information exchange between the operator and a third party without providing access to the interactive information exchange to the visitor; and
   selectively displaying information from the third party, the first data from the operator, and the second data from the visitor in the first window frame.

2. The method of claim 1, wherein the chat session comprises live and interactive information exchange between the operator and the visitor.

3. The method of claim 1, further comprising selectively activating a third window frame on the first computing device of the operator for monitoring a plurality of chat sessions, wherein the monitoring comprises generating a chat session status indicator to indicate at least one of: a visitor waiting to instantiate a chat session, a visitor waiting for response from the operator, an operator waiting for response from the visitor, an idle chat session where input from a visitor has not been provided for a predetermined period of time, and prior chat session of a visitor.

4. The method of claim 1, further comprising:
   monitoring a plurality of chat sessions; and
   generating and managing a knowledge base, said knowledge comprises stored information indicative of prior chat sessions and data exchanged during the chat sessions.

5. The method of claim 4, further comprising instantiating a graphical user interface for accessing the knowledge base during a chat session.

6. The method of claim 5, wherein the accessing comprises at least one of:
   selectively adding information to the knowledge base;
   selectively searching for information previously stored in the knowledge base;
   selectively retrieving information from the knowledge base; and
   selectively displaying information retrieved from the knowledge base.

7. The method of claim 1, further comprising providing billboard messages including at least one of a text-based message, graphical display, and a clickable hyperlink, wherein the billboard messages comprise a window advertising panel associated with the chat session.

8. The method of claim 1, wherein the first, second and third window frames are provided via at least one of the Internet, an intra-net and an application programming interface (API).

9. The method of claim 6, wherein the selectively adding information to the knowledge base comprises retrieving information from the at least one of data input during a chat session and a ticket generated in connection with a prior or current chat session.

10. The method of claim 1, further comprising managing emails from visitors to the website, and generating or viewing tickets associated with respective chat sessions.

11. The method of claim 1, selectively activating a third window frame on the first computing device of the operator for monitoring a plurality of chat sessions, wherein the monitoring comprises providing a status indicator for each of the plurality of chat sessions.

12. A system for conducting a chat session between an operator of a website and a visitor over a communication network, the system comprising:
   a first computing device providing interactive information input and display within a first window frame instantiating at least one chat session for receiving real-time first data input from the operator and second data input from the visitor; and
   a second computing device instantiating the least one chat session for receiving real-time the first data from the operator and the second data from the visitor;
   wherein the first computing device further selectively instantiates in the first window frame, during the at least one chat session, an interactive information exchange between a third party and the operator for receiving real-time third data from the third party,
   the information exchange between the third party and the operator is instantiated without providing access to the third data to the visitor, and
   the third data from the from the third party, the first data from the operator, and the second data from the visitor are selectively displayed in the first window frame provided within a graphical user interface of the first computing device of the operator.

13. The system of claim 12, wherein the first computing device further selectively activates a third window frame for at least one of: monitoring a plurality of chat sessions, managing emails from visitors to the website, and generating or viewing tickets associated with respective chat sessions.

14. The system of claim 12, wherein the first computing device further selectively generates a chat session status indicator in the third window to indicate at least one of: a visitor waiting to instantiate a chat session, a visitor waiting for response from the operator, an operator waiting for response from the visitor, an idle chat session where input from a visitor has not been provided for a predetermined period of time, and prior chat session of a visitor.

15. The method of claim 4, wherein the generating of the chat session status indicator comprises color coding uniquely indicative of the at least one of: the visitor waiting to instantiate a chat session, the visitor waiting for response from the operator, the operator waiting for response from the visitor, the idle chat session, and the prior chat session.

16. The system of claim 12, wherein the monitoring comprises providing a status indicator for each of the plurality of chat sessions.

17. The system of claim 14, wherein the generating of the chat session status indicator comprises color coding uniquely indicative of the at least one of: the visitor waiting to instantiate a chat session, the visitor waiting for response from the operator, the operator waiting for response from the visitor, the idle chat session, and the prior chat session.

18. A method for establishing and monitoring sessions with clients over a communication network, the method comprising:

conducting at least one chat session between a first party and a second party;

selectively activating a first window frame on a first computing device of the first party instantiating the at least one chat session for receiving real-time first data input from the first party and second data input from the second party;

during the chat session, instantiating interactive information exchange between the first party and a third party without providing access to the interactive information exchange to the second party; and selectively displaying information from the third party, the first data from the first party, and the second data from the second party in the first window frame.

19. The method of claim 18, further comprising:

monitoring a plurality of chat sessions; and generating and managing a knowledge base, said knowledge comprises stored information indicative of prior chat sessions and data exchanged during the chat sessions.

20. The method of claim 19, further comprising selectively accessing the knowledge base, wherein the accessing comprises at least one of:

selectively accessing the knowledge base during the chat session;

selectively adding information to the knowledge base;

selectively searching for information previously stored in the knowledge base;

selectively retrieving information from the knowledge base; and selectively displaying information retrieved from the knowledge base.

* * * * *